(12) United States Patent
Jocker et al.

(10) Patent No.: US 12,032,110 B2
(45) Date of Patent: Jul. 9, 2024

(54) ELASTIC PARAMETER ESTIMATION

(71) Applicant: Schlumberger Technology Corporation, Sugar Land, TX (US)

(72) Inventors: Jeroen Jocker, The Hague (NL); John Adam Donald, Abu Dhabi (AE); Cheolkyun Jeong, Beijing (CN); Boxian Jing, Katy, TX (US); Erik Wielemaker, The Hague (NL); Florian Karpfinger, Dhahran (SA)

(73) Assignee: Schlumberger Technology Corporation, Sugar Land, TX (US)

( * ) Notice: Subject to any disclaimer, the term of this patent is extended or adjusted under 35 U.S.C. 154(b) by 607 days.

(21) Appl. No.: 16/304,356

(22) PCT Filed: May 23, 2017

(86) PCT No.: PCT/US2017/033898
§ 371 (c)(1),
(2) Date: Nov. 26, 2018

(87) PCT Pub. No.: WO2017/205307
PCT Pub. Date: Nov. 30, 2017

(65) Prior Publication Data
US 2019/0293815 A1    Sep. 26, 2019

Related U.S. Application Data

(60) Provisional application No. 62/341,446, filed on May 25, 2016.

(51) Int. Cl.
*G01V 1/30* (2006.01)
*G01V 1/28* (2006.01)
(Continued)

(52) U.S. Cl.
CPC .............. *G01V 1/306* (2013.01); *G01V 1/282* (2013.01); *G01V 1/46* (2013.01); *G01V 1/48* (2013.01);
(Continued)

(58) Field of Classification Search
CPC .. G01V 1/306; G01V 1/282; G01V 2210/614; G01V 2210/6242; G01V 2210/626
See application file for complete search history.

(56) References Cited

U.S. PATENT DOCUMENTS 6,459,993 B1    10/2002   Valero
6,611,761 B2    8/2003    Sinha
(Continued)

FOREIGN PATENT DOCUMENTS

CA    2913289 A1    12/2014
EP    1324076 A2    7/2003
(Continued)

OTHER PUBLICATIONS

Walsh et al., Derivation of Anisotropy Parameters in a Shale Using Borehole Sonic Data, 2008, American Rock Mechanics Association, ARMA 08-272, 6 pp. (Year: 2008).*
(Continued)

*Primary Examiner* — Manuel L Barbee
(74) *Attorney, Agent, or Firm* — Jeffrey D. Frantz

(57) ABSTRACT

A method includes receiving information that includes elastic property information and that includes sonic data acquired via a tool disposed at a plurality of depths in a bore in a subterranean environment that includes at least one anisotropic formation; processing the information to generate processed information where the processed information includes variance information associated with the elastic property information and where the processed information includes velocity information and orientation information
(Continued)

associated with the sonic data; performing an inversion based at least in part on the processed information; and outputting values for elastic parameters based at least in part on the inversion.

18 Claims, 16 Drawing Sheets

(51) Int. Cl.
  *G01V 1/46* (2006.01)
  *G01V 1/48* (2006.01)
  *G01V 1/50* (2006.01)
(52) U.S. Cl.
  CPC .......... *G01V 1/50* (2013.01); *G01V 2210/614* (2013.01); *G01V 2210/6169* (2013.01); *G01V 2210/6242* (2013.01); *G01V 2210/626* (2013.01); *G01V 2210/66* (2013.01)

(56) References Cited

U.S. PATENT DOCUMENTS

| | | |
|---|---|---|
| 6,614,716 B2 | 9/2003 | Plona |
| 6,654,688 B1 | 11/2003 | Brie |
| 6,714,480 B2 | 3/2004 | Sinha et al. |
| 6,868,341 B2 | 3/2005 | Valero |
| 7,423,930 B2 | 9/2008 | Valero |
| 7,529,152 B2 | 5/2009 | Sinha |
| 7,660,196 B2 | 2/2010 | Saiki |
| 7,675,813 B2 | 3/2010 | Valero |
| 7,764,572 B2 | 7/2010 | Wu |
| 7,957,905 B2 | 6/2011 | Heigl |
| 8,175,807 B2 | 5/2012 | Suarez-Rivera et al. |
| 8,332,156 B2 | 12/2012 | Liu |
| 8,547,789 B2 | 10/2013 | Wu |
| 8,730,763 B2 | 5/2014 | Johnson |
| 8,964,503 B2 | 2/2015 | Manning |
| 9,086,508 B2 | 7/2015 | Sinha |
| 9,213,122 B2 | 12/2015 | Horne et al. |
| 2002/0183930 A1 | 12/2002 | Plona et al. |
| 2008/0086287 A1 | 4/2008 | Xu et al. |
| 2009/0210160 A1 | 8/2009 | Suarez-Rivera et al. |
| 2012/0078600 A1 | 3/2012 | Horne et al. |
| 2013/0116925 A1 | 5/2013 | Hruska |
| 2013/0206475 A1 | 8/2013 | Prioul |
| 2014/0005946 A1 | 1/2014 | Mandal |
| 2014/0019058 A1 | 1/2014 | Donderici |
| 2014/0169130 A1 | 6/2014 | Aeron |
| 2014/0365420 A1 | 12/2014 | Jocker et al. |
| 2015/0137987 A1 | 5/2015 | Donderici et al. |
| 2015/0285936 A1 | 10/2015 | Sinha et al. |
| 2019/0154856 A1 | 5/2019 | Valero et al. |

FOREIGN PATENT DOCUMENTS

| | | |
|---|---|---|
| WO | 2013016470 A2 | 1/2013 |
| WO | 2013112466 A1 | 8/2013 |

OTHER PUBLICATIONS

Bachrach et al., Recent Advances in the Characterization of Unconventional Reservoirs with Wide-Azimuth Seismic Data, 2014 SEG Denver 2014 Annual Meeting, pp. 4432-4443 (Year: 2014).*
One_Petro_Search_Results, Mar. 22, 2021, 7 pp. (Year: 2021).*
Jocker et al., Seismic Anisotropy Characterization in Heterogeneous Formations Using Borehole Sonic Data, Sep. 30-Oct. 2, 2013, SPE Annual Technical Conference and Exhibition, New Orleans, Louisiana, 11 pp. (Year: 2013).*
Walsh et al., Formation Anisotropy Parameters Using Borehole Sonic Data, Jun. 4-7, 2006, SPWLA 47th Annual Logging Symposium, 7 pp. (Year: 2006).*
Extended Search Report issued in the related EP Application 17803380.9, dated Dec. 18, 2019 (8 pages).
Burridge, R., Kostek, S., and Kurkjian, A., Tube waves, seismic waves and effective sources, Wave motion 18 (1993) pp. 163-210.
Chi, S., and Tang, X., Stoneley-wave speed modeling in general anisotropic formations, Geophysics, vol. 71, No. 4 (Jul.-Aug. 2006), pp. F67-F77.
Gu, M., Quirein, J., Murphy, E., Rivera Barraza, S., and Ou, L., Method for acoustic anisotropy interpretation in shales when the Stoneley-wave velocity is missing, Petrophysics, vol. 57, No. 2, (Apr. 2016), p. 140-155.
Haldorsen, J., Johnson, D., Plona, T., Sinha, B. Valero, H.P., and Winkler, K., Borehole acoustic waves, Oilfield Review (Spring 2006), pp. 34-43.
Helbig, K. and Schoenberg, M., Anomalous polarization of elastic waves in transversely isotropic media, Journal of the Acoustical Society of America, 81 (5), (May 1987), pp. 1235-1245.
Horne, S., and Walsh, J., Research Note: Transverse isotropy estimation from dipole sonic logs acquired in pilot and production wells, Geophysical Prospecting, 62, (2014), pp. 404-411.
Jones, L.E., and Wang, H.F., Ultrasonic velocities in Cretaceous shales from the Williston basin, Geophysics, vol. 46, No. 3 (Mar. 1981), pp. 288-297.
Karpfinger, F. and Jocker, J. and Prioul, R., Theoretical estimate of the tube-wave modulus in arbitrarily anisotropic media: Comparisons between semianalytical, FEM, and approximate solutions, Geophysics, vol. 77, No. 5 (Sep.-Oct. 2012), pp. D199-D208.
Malinverno, A., and Briggs, V., Expanded uncertainty quantification in inverse problems: Hierarchical Bayes and empirical Bayes, Geophysics, vol. 69, No. 4 (Jul.-Aug. 2004), pp. 1005-1016.
Norris, A., and Sinha, B., Weak elastic anisotropy and the tube wave, Geophysics, vol. 58, No. 08 (Aug. 1993) pp. 1091-1098.
Sayers, C., Seismic anisotropy of shales, Geophysical Prospecting, (2005), 53, pp. 667-676.
Thomsen, L., Weak elastic anisotropy, Geophysics, vol. 51, No. 10 (Oct. 1986), pp. 1954-1966.
Tsvankin, I., P-wave signatures and notation for transversely isotropic media: An overview, Geophysics, vol. 61, No. 2 ( Mar.-Apr. 1996), pp. 467-483.
Kainkaryam, S., et al., Ray-based imaging and model building in tilted orthorhombic media, SEG New Orleans Annual Meeting (2015) (5 pages).
Kainkaryam, S., et al., Quadratic form tomography for tilted orthorhombic media, SEG New Orleans Annual Meeting (2015). (5 pages).
Narhari et al., A case study of prestack orthotropic AVAz inversion for fracture characterization of a tight Deep Carbonate reservoir in Kuwait, SEG Denver Annual Meeting (2014). (5 pages).
Tsvankin, I., Anisotropic parameters and P-wave velocity for orthorhombic media, Geophysics, vol. 62, No. 4, pp. 1292-1309 (1997).
International Search Report and Written Opinion issued in the related PCT Application PCT/US2017/033898 dated Aug. 21, 2017 (15 pages).
International Preliminary Report on Patentability issued in the related PCT Application PCT/US2017/033898 dated Nov. 27, 2018 (11 pages).
Jocker, J., M.Ferla, F.Pampuri, E.Wielemaker (2013), Seismic Anisotropy Characterization in Heterogeneous Formations Using Borehole Sonic Data, SPE 166463, New Orleans, Louisiana, USA, Sep. 30-Oct. 2, 2013 (11 pages).
Walsh, J., B. Sinha, and A. Donald, (2006), Formation Anisotropy Parameters Using Borehole Sonic Data, SPWLA 47, Annual Logging Symposium, Jun. 4-7, 2006 (7 Pages).
Jocker et al., 2013, TI Anisotropic Model Building Using Borehole Sonic Logs Acquired in Heterogeneous Formations, SEG Houston Annual Meeting, pp. 305 to 309.
Office Action issued in the EP Application 17803380.9, dated Dec. 16, 2020 (6 pages).

* cited by examiner

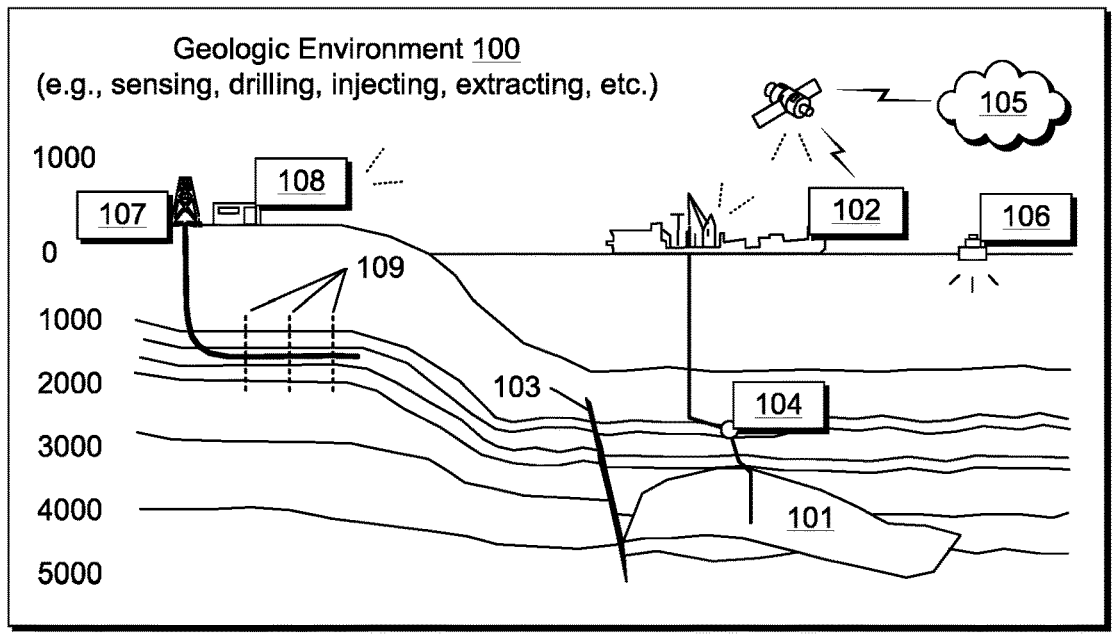
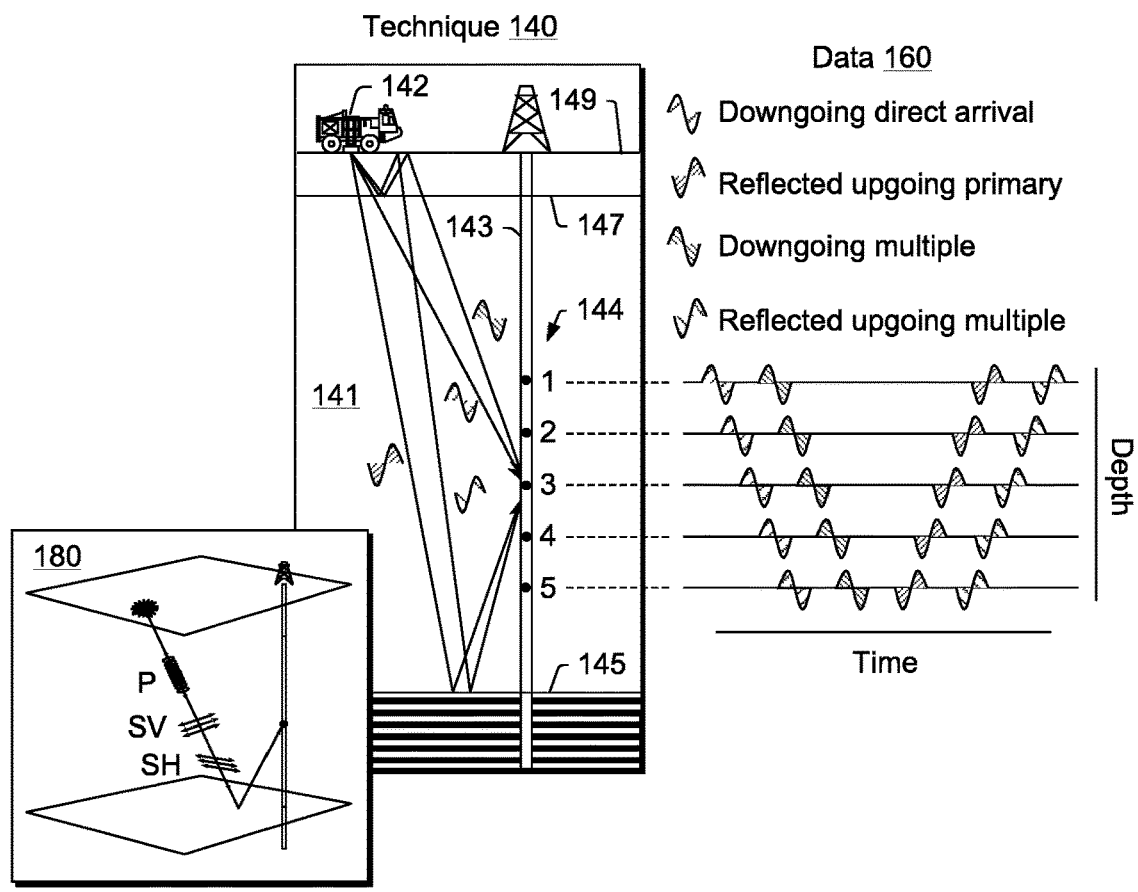
Fig. 1

Parameters 900

Inversion settings
PG [group]:              Use phase /group assumption (options: phase /group)
Stsh [exact]:            Weak/exact relationship for Stoneley shear (options: weak/exact)
Prior [predefined]:      Type of prior information to be used
                         (options: none /predefined/ dynamic /static/offset)

Smart parameter settings
$\varepsilon_{min}$ [-0.2]:     Thomsen's epsilon (initial) minimum
$\varepsilon_{max}$ [0.8]:      Thomsen's epsilon (initial) maximum
$\gamma_{min}$ [-0.2]:          Thomsen's gamma (initial) minimum
$\gamma_{max}$ [0.8]:           Thomsen's gamma (initial) maximum
$\#_{\sigma}$ [1]:              Number of standard deviations used in smart parameter logic Modelspace definition
$\#C_{ij}$ [6]:                 Number of values on the C ij axes of the modelspace
$\delta_{min}$ [-0.4]:          Thomsen's delta (initial) minimum
$\delta_{max}$ [0.6]:           Thomsen's delta (initial) maximum
      [20]:                     Number of values on the Thomsen's delta axis of the modelspace
$\Delta V_{max}$ [5m/s]:        Maximum velocity incremental step during the final iteration
$MS_{red}$ [0.7]:               Modelspace refinement factor from one iteration to the next Miscellaneous
$\Theta_{cr}$ [10]:             Max. allowed deviation from 0 or 90 degrees relative dip
$\sigma_{qP}$ [1%]:             VqP standard deviation (relative, in %)
$\sigma_{qSV}$ [2%]:            VqSV standard deviation (relative, in %)
$\sigma_{SH}$ [2%]:             VSH standard deviation (relative, in %)
$\sigma_{Stsh}$ [3%]:           VStsh standard deviation (relative, in %)

Lookup table settings        - VqP(group) and VqSV(group)
VP /VS -axis:                linspace(1.4, 5, 19)
$\varepsilon$—axis:          linspace( -0.3, 1.8, 43 )
$\delta$—axis:               linspace( -0.4, 0.8, 25 )
reldip-axis:                 linspace(0, 90, 91 )

Lookup table settings        - VStsh(exact )
VP /VS -axis:                linspace(1.4, 5, 19)
VSH90 -axis:                 linspace(400, 4100 , 19)
$\varepsilon$—axis:          linspace( -0.3, 1.8, 19 )
$\gamma$—axis:               linspace( -0.3, 1.8, 19 )
$\delta$—axis:               linspace( -0.4, 0.8, 19 )
reldip-axis:                 linspace(0, 90, 10 )

Fig. 9

ELASTIC PARAMETER ESTIMATION

RELATED APPLICATIONS

This application is the National Stage Entry of International Application No. PCT/US2017/033898, filed May 23, 2017, which claims priority to and the benefit of a US Provisional Application having Ser. No. 62/341,446, filed 25 May 2016, which is incorporated by reference herein.

BACKGROUND

Reflection seismology finds use in geophysics, for example, to estimate properties of subsurface formations (e.g., to characterize a subterranean environment with one or more formations). As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks.

Reflection seismology data can be used to understand or characterize one or more subsurface formations. As an example, a subsurface medium can be anisotropic if its properties depend on the direction in which these properties are measured. A particular kind of anisotropy is elastic anisotropy. An example of elastic anisotropy is the compressional velocity of shale formations, which may be found to be greater when measured in the direction parallel to shale bedding than when measured orthogonal to shale bedding. In terms of elastic properties, shales may be characterized using a so-called transversely isotropic (TI) model, which may also be referred to as a transverse isotropy (TI) model (e.g., as known from elasticity theory). Propagation of seismic energy, as in reflection seismology, can depend on one or more characteristics of a subsurface medium or media.

SUMMARY

In accordance with some embodiments, a method can include receiving information that includes elastic property information and that includes sonic data acquired via a tool disposed at a plurality of depths in a bore in a subterranean environment that includes at least one anisotropic formation; processing the information to generate processed information where the processed information includes variance information associated with the elastic property information and where the processed information includes velocity information and orientation information associated with the sonic data; performing an inversion based at least in part on the processed information; and outputting values for elastic parameters based at least in part on the inversion.

In some embodiments, an aspect of a method includes outputting values for elastic parameters as a substantially continuous description with respect to depth.

In some embodiments, an aspect of a method includes processing information to generate processed information that includes arithmetic means and variances for a plurality of anisotropy parameters and optionally covariances between anisotropy parameters. In some embodiments, processed information can include arithmetic means and variances for a plurality of anisotropy parameters and covariances between the anisotropy parameters.

In some embodiments, an aspect of a method includes outputting probability distributions.

In some embodiments, an aspect of a method includes elastic parameters that include elastic parameters associated with a depth.

In some embodiments, an aspect of a method includes receiving elastic property information that includes sets of values for elastic parameters.

In some embodiments, an aspect of a method includes at least one five parameter model where, for example, the at least one five parameter model includes four elastic stiffness parameters, which can be $C_{11}$, $C_{33}$, $C_{44}$, and $C_{66}$.

In some embodiments, an aspect of a method includes defining a multi-parameter modelspace where, for example, the multi-parameter modelspace is defined by combinations of elastic stiffness parameters $C_{11}$, $C_{33}$, $C_{44}$, and $C_{66}$ and the Thomsen's $\delta$ parameter.

In some embodiments, an aspect of a method includes elastic parameters that include at least five independent anisotropy parameters.

In some embodiments, an aspect of a method includes sonic data that include velocity measurements.

In some embodiments, an aspect of a method includes taking into account measurement uncertainty of velocity measurements.

In accordance with some embodiments, a system can include a processor; memory accessible by the processor; and processor-executable instructions stored in the memory that are executable to instruct the system to: receive information that includes elastic property information and that includes sonic data acquired via a tool disposed at a plurality of depths in a bore in a subterranean environment that includes at least one anisotropic formation; process the information to generate processed information where the processed information includes variance information associated with the elastic property information and where the processed information includes velocity information and orientation information associated with the sonic data; perform an inversion based at least in part on the processed information; and output values for elastic parameters based at least in part on the inversion.

In some embodiments, an aspect of a system includes values for elastic parameters that include values that define a substantially continuous description for each of the elastic parameters with respect to depth.

In accordance with some embodiments, one or more computer-readable storage media can include computer-executable instructions to instruct a system to: receive information that comprises elastic property information and that comprises sonic data acquired via a tool disposed at a plurality of depths in a bore in a subterranean environment that includes at least one anisotropic formation; process the information to generate processed information where the processed information includes variance information associated with the elastic property information and where the processed information includes velocity information and orientation information associated with the sonic data; perform an inversion based at least in part on the processed information; and output values for elastic parameters based at least in part on the inversion.

In some embodiments, an aspect of one or more computer-readable storage media includes instructions to instruct a system to output values for elastic parameters that include values that define a substantially continuous description for each of the elastic parameters with respect to depth.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 1 illustrates an example of a geologic environment and an example of a technique;

FIG. 9 illustrates examples of parameters of a workflow;

DETAILED DESCRIPTION

Figure 2:
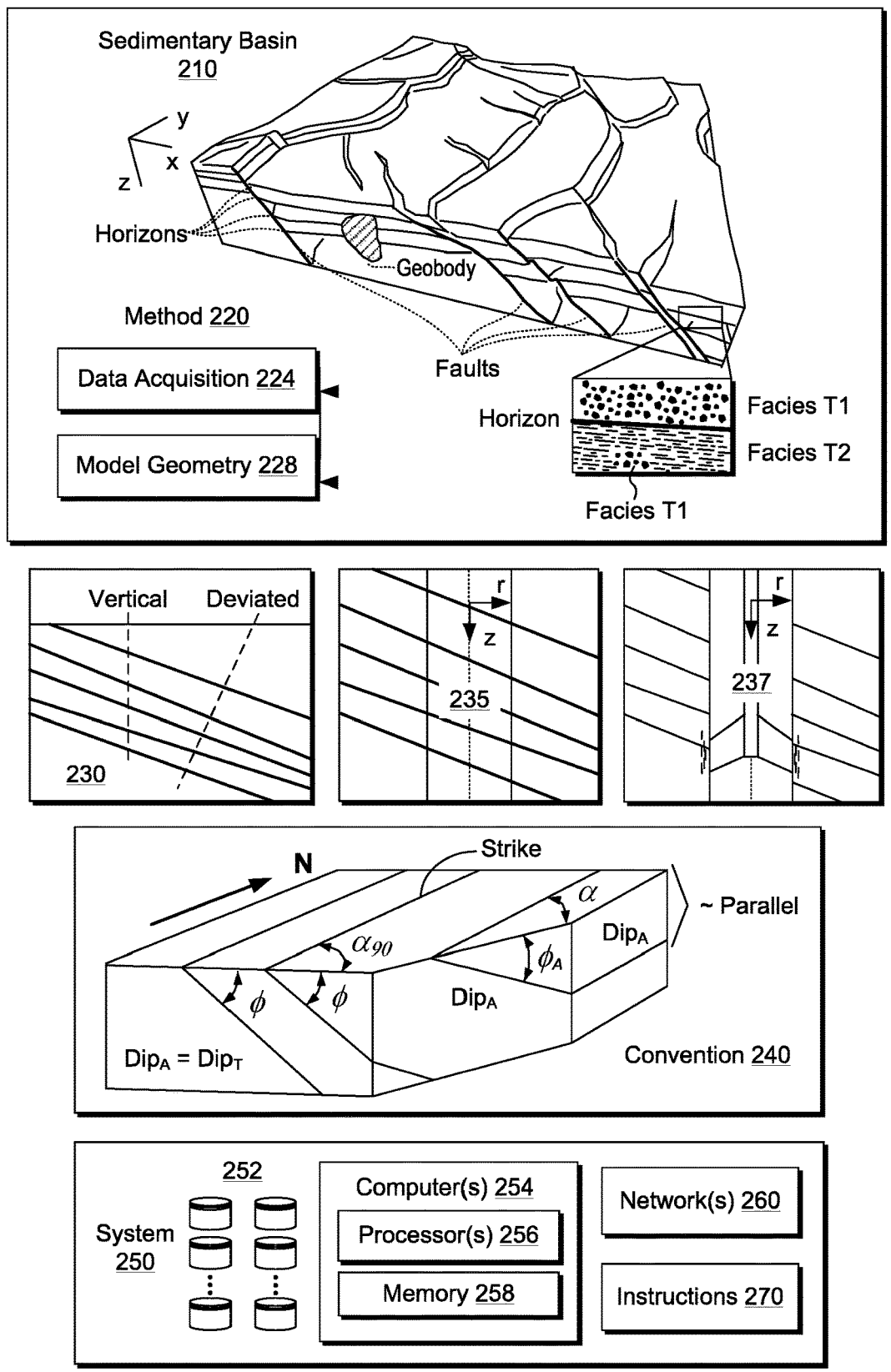
FIG. 2 illustrates examples of an environment, an example of a method and an example of a convention.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than 1 Hz and/or optionally more than 100 Hz). Seismic data may be processed and interpreted, for example, to understand better composition, fluid content, extent and geometry of subsurface rocks.

FIG. 1 shows an example of a geologic environment 100 (e.g., an environment that includes a sedimentary basin, a reservoir 101, a fault 103, one or more fractures 109, etc.) and an example of an acquisition technique 140 to acquire seismic data (see, e.g., data 160). As an example, a system may process data acquired by the technique 140, for example, to allow for direct or indirect management of sensing, drilling, injecting, extracting, etc., with respect to the geologic environment 100. In turn, further information about the geologic environment 100 may become available as feedback (e.g., optionally as input to the system). As an example, an operation may pertain to a reservoir that exists in the geologic environment 100 such as, for example, the reservoir 101. As an example, a technique may provide information (e.g., as an output) that may specify one or more location coordinate of a feature in a geologic environment, one or more characteristics of a feature in a geologic environment, etc.

As an example, the geologic environment 100 may be referred to as or include one or more formations. As an example, a formation may be a unit of lithostratigraphy, for example, a body of rock that is sufficiently distinctive and continuous that it can be mapped. As an example, in stratigraphy, a formation may be a body of strata of predominantly one type or combination of types, for example, where multiple formations form groups, and subdivisions of formations are members.

As an example, a sedimentary basin may be a depression in the crust of the Earth, for example, formed by plate tectonic activity in which sediments accumulate. Over a period of geologic time, continued deposition may cause further depression or subsidence. With respect to a petroleum systems analysis, if rich hydrocarbon source rocks occur in combination with appropriate depth and duration of burial, hydrocarbon generation may possibly occur within a basin. Exploration plays and prospects may be developed in basins or regions in which a complete petroleum system has some likelihood of existing. The geologic environment 100 of FIG. 1 may include one or more plays, prospects, etc.

As an example, a system may be implemented to process seismic data, optionally in combination with other data. Processing of data may include generating one or more seismic attributes, rendering information to a display or displays, etc. A process or workflow may include interpretation, which may be performed by an operator that examines renderings of information and that identifies structure or other features within such renderings. Interpretation may be or include analyses of data with a goal to generate one or more models and/or predictions (e.g., about properties and/or structures of a subsurface region).

As an example, a system may include features of a commercially available framework such as the PETREL® seismic-to-simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment, decision making, operational control, etc.).

As an example, a system may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components (e.g., modules, blocks, etc.) may be implemented as add-ons (or plug-ins) that conform to and operate according to specifications of a framework environment (e.g., according to application programming interface (API) specifications, etc.).

As an example, seismic data may be processed using a framework such as the OMEGA® framework (Schlumberger Limited, Houston, TX). The OMEGA® framework provides features that can be implemented for processing of seismic data, for example, through prestack seismic interpretation and seismic inversion. A framework may be scalable such that it enables processing and imaging on a single workstation, on a massive compute cluster, etc. As an example, one or more techniques, technologies, etc. described herein may optionally be implemented in conjunction with a framework such as, for example, the OMEGA® framework.

A framework for processing data may include features for 2D line and 3D seismic surveys. Modules for processing seismic data may include features for prestack seismic interpretation (PSI), optionally pluggable into a framework such as the OCEAN® framework. A workflow may be specified to include processing via one or more frameworks, plug-ins, add-ons, etc. A workflow may include quantitative interpretation, which may include performing pre- and poststack seismic data conditioning, inversion (e.g., seismic to properties and properties to synthetic seismic), wedge modeling for thin-bed analysis, amplitude versus offset (AVO) and amplitude versus angle (AVA) analysis, reconnaissance, etc. As an example, a workflow may aim to output rock properties based at least in part on processing of seismic data. As an example, various types of data may be processed to provide one or more models (e.g., earth models). For example, consider processing of one or more of seismic data, well data, electromagnetic and magnetic telluric data, reservoir data, etc.

In the example of FIG. 1, the geologic environment 100 includes an offshore portion and an on-shore portion. As an example, a geologic environment may be or include one or more of an offshore geologic environment, a seabed geologic environment, an ocean bed geologic environment, etc.

As an example, the geologic environment 100 may be outfitted with any of a variety of sensors, detectors, actuators, etc. For example, equipment 102 may include communication circuitry to receive and to transmit information with respect to one or more networks 105. Such information may include information associated with downhole equipment 104, which may be equipment to acquire information, to assist with resource recovery, etc. Other equipment 106 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 105 that may be configured for communications, noting that the satellite may additionally or alternatively include circuitry for imagery (e.g., spatial, spectral, temporal, radiometric, etc.).

FIG. 1 also shows the geologic environment 100 as optionally including equipment 107 and 108 associated with a well that includes a substantially horizontal portion that may intersect with one or more of the one or more fractures 109. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 107 and/or 108 may include components, a system, systems, etc. for fracturing, seismic sensing, analysis of seismic data, assessment of one or more fractures, etc.

As an example, a system may be used to perform one or more workflows. A workflow may be a process that includes a number of worksteps. A workstep may operate on data, for example, to create new data, to update existing data, etc. As an example, a system may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.). As an example, a workflow may include rendering information to a display (e.g., a display device). As an example, a workflow may include receiving instructions to interact with rendered information, for example, to process information and optionally render processed information. As an example, a workflow may include transmitting information that may control, adjust, initiate, etc. one or more operations of equipment associated with a geologic environment (e.g., in the environment, above the environment, etc.).

In FIG. 1, the technique 140 may be implemented with respect to a geologic environment 141. As shown, an energy source (e.g., a transmitter) 142 may emit energy where the energy travels as waves that interact with the geologic environment 141. As an example, the geologic environment 141 may include a bore 143 where one or more sensors (e.g., receivers) 144 may be positioned in the bore 143. As an example, energy emitted by the energy source 142 may interact with a layer (e.g., a structure, an interface, etc.) 145 in the geologic environment 141 such that a portion of the energy is reflected, which may then be sensed by one or more of the sensors 144. Such energy may be reflected as an upgoing primary wave (e.g., or "primary" reflected wave). As an example, a portion of emitted energy may be reflected by more than one structure in the geologic environment and referred to as a multiple reflected wave (e.g., or "multiple"). For example, the geologic environment 141 is shown as including a layer 147 that resides below a surface layer 149. Given such an environment and arrangement of the source 142 and the one or more sensors 144, energy may be sensed as being associated with particular types of waves.

As an example, a "multiple" may refer to multiply reflected seismic energy or, for example, an event in seismic data that has incurred more than one reflection in its travel path. As an example, depending on a time delay from a primary event with which a multiple may be associated, a multiple may be characterized as a short-path or a peg-leg, for example, which may imply that a multiple may interfere with a primary reflection, or long-path, for example, where a multiple may appear as a separate event. As an example, seismic data may include evidence of an interbed multiple from bed interfaces, evidence of a multiple from a water interface (e.g., an interface of a base of water and rock or sediment beneath it) or evidence of a multiple from an air-water interface, etc.

As shown in FIG. 1, the acquired data 160 can include data associated with downgoing direct arrival waves, reflected upgoing primary waves, downgoing multiple reflected waves and reflected upgoing multiple reflected waves. The acquired data 160 is also shown along a time axis and a depth axis. As indicated, in a manner dependent at least in part on characteristics of media in the geologic environment 141, waves travel at velocities over distances such that relationships may exist between time and space. Thus, time information, as associated with sensed energy, may allow for understanding spatial relations of layers, interfaces, structures, etc. in a geologic environment.

FIG. 1 also shows various types of waves including P, SV and SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that may characterize anisotropy of media (e.g., seismic anisotropy), consider the Thomsen parameters $\epsilon$, $\delta$ and $\gamma$. As an example, the Thomsen parameter $\delta$ may be used to describe depth mismatch between logs (e.g., actual depth) and seismic depth. As to the Thomsen parameter $\epsilon$, it may be used to describe, for example, a difference between vertical and horizontal compressional waves (e.g., P or P-wave or quasi compressional wave qP or qP-wave). As to the Thomsen parameter $\gamma$, it may be used to describe, for example, a difference between a shear wave traveling perpendicular to bedding versus a shear wave traveling through the same bedding but parallel to the bedding while also being polarized parallel to the bedding. As an example, consider shale where the Thomsen parameter $\gamma$ describes the difference between a shear wave traveling perpendicular to shale bedding versus a shear wave traveling through the same shale bedding but parallel to the shale bedding while also being polarized parallel to the shale bedding. In the context of the foregoing example, in general, use of the terms "vertical" and "horizontal" implies that shale bedding is horizontal; noting that a method may account for shale bedding (e.g., or other type of formation) that may deviate from horizontal (e.g., consider a formation that includes a tilted axis with respect to horizontal).

While most shales tend to be deposited more or less in a horizontal plane, the Thomsen parameters can be described with respect to differences in velocities of waves travelling perpendicular versus parallel to shale beds; consider the Thomsen parameter $\epsilon$ as quantifying this difference for compressional wave propagation, and the Thomsen parameter $\gamma$ as pertaining to SH shear wave propagation.

As an example, the Thomsen parameters $\epsilon$ and $\gamma$ may be estimated from wave data while estimation of the Thomsen parameter $\delta$ may involve access to additional information. As to prior information, one or more sources may provide values for parameters such as one or more of the Thomsen parameters. For example, a source may be a database that includes values for various types of media. A source may be an article such as, for example, Thomsen, "Weak elastic anisotropy", Geophysics, Vol. 51, No. 10, pp. 1954-1966, October 1986, which provides a table of measured anisotropy in sedimentary rocks where such rocks include sandstones, shales, mudshales, silty limestones, clayshales, laminated siltstones, tuff, crystals (e.g., hexagonal, etc.), gypsum weathered materials, etc.

As an example, seismic data may be acquired for a region in the form of traces. In the example of FIG. 1, the technique 140 may include the source 142 for emitting energy where portions of such energy (e.g., directly and/or reflected) may be received via the one or more sensors 144. As an example, energy received may be discretized by an analog-to-digital converter that operates at a sampling rate. For example, acquisition equipment may convert energy signals sensed by a sensor to digital samples at a rate of one sample per approximately 4 ms. Given a speed of sound in a medium or media, a sample rate may be converted to an approximate distance. For example, the speed of sound in rock may be of the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, data acquisition, reservoir simulation, petroleum systems modeling, etc. may be applied to characterize various types of subsurface environments, including environments such as those of FIG. 1.

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

The aforementioned commercially available modeling framework marketed as the PETROMOD® framework (Schlumberger Limited, Houston, Texas) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows. As an example, the TECHLOG® framework may be implemented in a workflow, for example, using one or more features for petrophysics (core and log), geology, drilling, reservoir and production engineering, and geophysics.

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230. As an example, a tool 237 may be positioned in a borehole, for example, to acquire information. As mentioned, a borehole tool may be configured to acquire electrical borehole images. As an example, the fullbore Formation MicroImager (FMI) tool (Schlumberger Limited, Houston, Texas) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, data can include geochemical data. For example, consider data acquired using X-ray fluorescence (XRF) technology, Fourier transform infrared spectroscopy (FTIR) technology and/or wireline geochemical technology.

XRF technology involves emission of characteristic "secondary" (or fluorescent) X-rays from a material that has been excited by bombardment with high-energy X-rays or gamma rays. XRF technology may be implemented for elemental analysis and chemical analysis, for example, as to research in geochemistry. As an example, in core analysis, XRF technology may be implemented to help determine mineral content. For example, elemental volumes may be inverted to mineral volumes by assuming certain standard formulae for mineral composition.

FTIR technology can involve analysis of an infrared spectrum of absorption, emission, photoconductivity or Raman scattering of a solid, liquid or gas. As an example, FTIR may be applied as a technique for quantitative mineralogical analysis of a sample of rock by measuring the effect of midrange infrared radiation transmitted through the sample. In such an example, the radiation excites vibrations in the chemical bonds within the mineral molecules at particular frequencies characteristic of each bond. The transmitted radiation may be compared with spectral standards for a variety of minerals, for example, to determine abundance of one or more minerals in the sample. As to sample preparation, consider, as an example, grinding a core plug to provide a representative sample that may be dispersed in a potassium bromide matrix and then subject to measurement and analysis.

As an example, one or more probes may be deployed in a bore via a wireline or wirelines. As an example, a probe may emit energy and receive energy where such energy may be analyzed to help determine mineral composition of rock surrounding a bore. As an example, nuclear magnetic resonance may be implemented (e.g., via a wireline, downhole NMR probe, etc.), for example, to acquire data as to nuclear magnetic properties of elements in a formation (e.g., hydrogen, carbon, phosphorous, etc.).

As an example, lithology scanning technology may be employed to acquire and analyze data. For example, consider the commercially available LITHO SCANNER™ technology marketed by Schlumberger Limited (Houston, Texas). As an example, a LITHO SCANNER™ tool may be a gamma ray spectroscopy tool. As an example, a workflow may include emission of neutrons by a pulsed neutron generator (PNG) of a tool to induce emission of gamma rays from a formation via interactions such as inelastic scattering interactions and thermal neutron capture interactions, which can produce gamma rays with a specific set of characteristic energies. In turn, gamma rays may be detected by a $LaBr_3$:Ce scintillator coupled to a high-temperature spectroscopy photomultiplier, producing signals that can be integrated, digitized, and processed by a high-performance pulse-height analyzer. Such an analyzer may determine, for example, pulse height (proportional to energy) of individually detected gamma rays and accumulate pulse-height histograms (spectra) that tally counts versus pulse height. Spectra may be acquired, for example, during and after each neutron burst, which helps to enable separation of inelastic and capture gamma rays. As an example, an individual spectrum may be decomposed into a linear combination of standard spectra from individual elements, which can involve adjustment for one or more environmental and/or electronic factors. As an example, coefficients of linear combination of standard spectra may be converted to elemental weight fractions, for example, via a modified geochemical oxides closure model, an inversion approach, etc. As to interpretation, various approaches may be implemented to generate mineralogy and lithologic fractions from the elemental concentration logs. As an example, a sequential SpectroLith processing approach may be used, which is based on the derivation of empirical relationships between elemental concentrations and mineral concentrations. As another example, an iterative inversion technique may be implemented (e.g., consider the TECHLOG® QUANTI™ multicomponent inversion ELAN module).

As an example, a method may include acquiring data (e.g., and/or receiving data) as measured via one or more techniques. Such techniques may include a micro-resistivity technique, a density and photoelectric factor or index technique, an image calibration technique, a dielectric and conductivity dispersion technique, a neutron porosity technique, an ultrasound technique, etc. As an example, a method may include acquiring data from dielectric measurement equipment and data from another type of measurement equipment and analyzing the data to detect at least one igneous deposit. In such an example, the data from the other type of measurement may be cross-referenced spatially with the data from the dielectric measurement equipment and analyzed to identify one or more igneous deposits (e.g., detect one or more igneous deposits, characterize one or more igneous deposits, etc.).

As an example, a workflow may utilize geochemical data, and optionally other data, for one or more processes (e.g., stratigraphic modeling, basin modeling, completion designs, drilling, production, injection, etc.). As an example, lithology scanner tool data may be used in a workflow or workflows that implement one or more frameworks (e.g., PETREL®, TECHLOG®, PETROMOD®, etc.).

As an example, a borehole may be vertical, deviate and/or horizontal. As an example, a tool may be positioned to acquire information in a horizontal portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the aforementioned TECHLOG® framework (Schlumberger Limited, Houston, Texas).

As to the convention 240 for dip, as shown, the three dimensional orientation of a plane can be defined by its dip and strike, which can be considered to be types of orientation information (e.g., structural orientation information). Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles $\phi$ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in any other direction except in the direction of true dip (see, e.g., $\phi_A$ as $Dip_A$ for angle $\alpha$); however, it is possible that the apparent dip is equal to the true dip (see, e.g., $\phi$ as $Dip_A = Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with $\phi$ as $Dip_A = Dip_T$ for angle $\alpha_{90}$ with respect to the strike). As indicated, dip observed in a cross-section in any other direction is apparent dip (see, e.g., surfaces labeled $Dip_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation and borehole azimuth) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. (e.g., consider a PETREL® seismic-to-simulation framework workflow, etc.). As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 2, the system 250 includes one or more information storage devices 252, one or more computers 254, one or more networks 260 and one or more sets of instructions 270. As to the one or more computers 254, each computer may include one or more processors (e.g., or processing cores) 256 and memory 258 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252.

As an example, the one or more sets of instructions 270 may include instructions stored in memory and accessible to one or more of the one or more processors 256 in a manner that allows for execution thereof by such of one or more processors 256 to instruct the system 250 to perform various actions. As an example, the system 250 may be configured such that the one or more sets of instructions 270 provide for establishing the framework 180 of FIG. 1 or a portion thereof. As an example, one or more methods, techniques, etc. may be performed using one or more sets of instructions, which may be, for example, one or more of the one or more sets of instructions 270 of FIG. 2.

As mentioned, seismic data may be acquired and analyzed to understand better subsurface structure of a geologic environment. Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than 1 Hz and/or optionally more than 100 Hz). Seismic data may be processed and interpreted, for example, to understand better composition, fluid content, extent and geometry of subsurface rocks.

Figure 3:
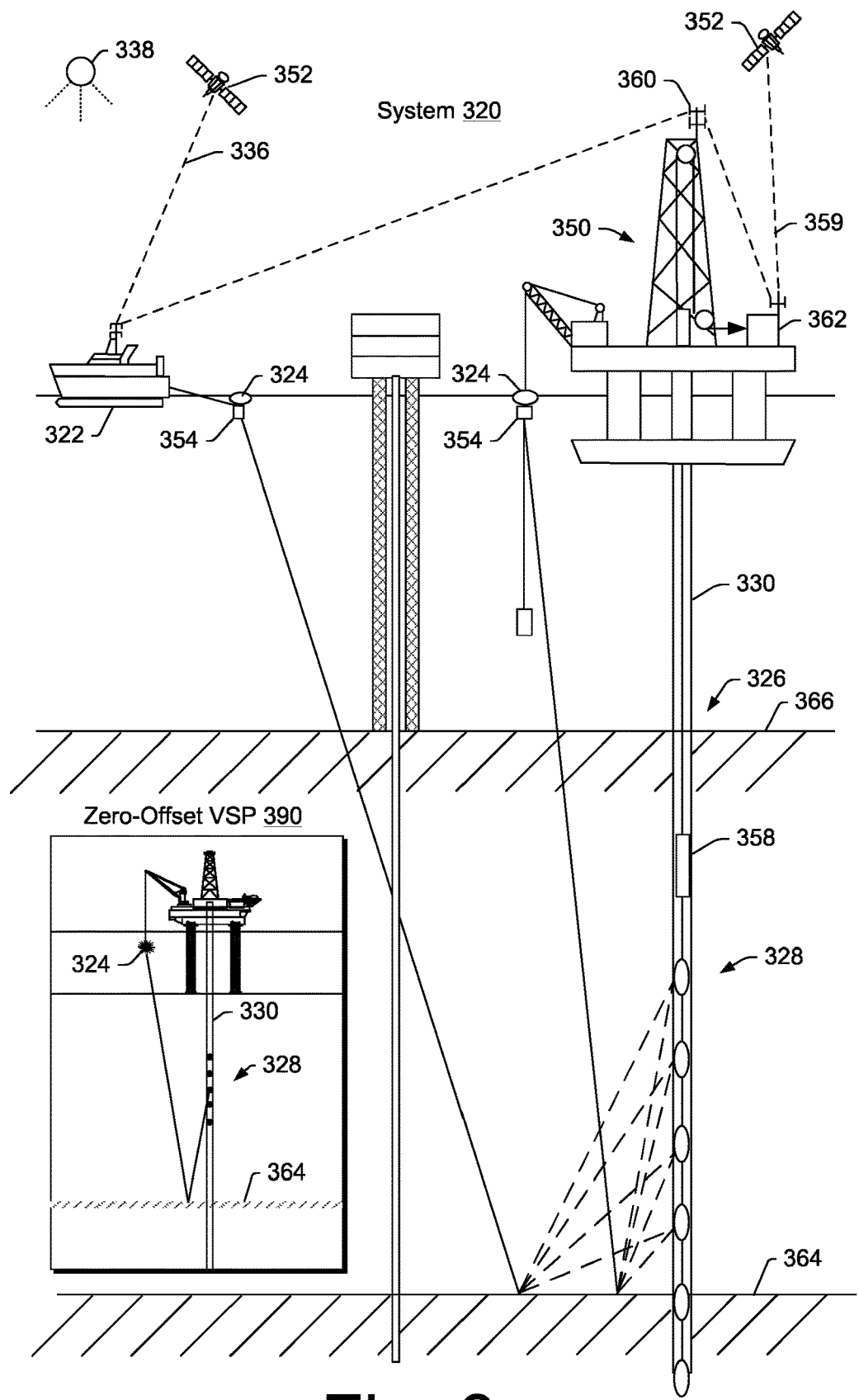
FIG. 3 illustrates an example of a survey technique.

FIG. 3 shows an example of a system 320 in which one or more vessels 322 may be employed to enable seismic profiling, e.g., three-dimensional vertical seismic profiling (VSP) or rig/offset vertical seismic profiling (VSP). In the example of FIG. 3, the system 320 is illustrated as including a rig 350, the vessel 322, and one or more acoustic receivers 328 (e.g., a receiver array). As an example, a vessel may include a source 324 (e.g., or source array) and/or the rig 350 may include a source 324 (e.g., or source array).

As an example, the vessel 322 may travel a path or paths where locations may be recorded through the use of navigation system signals 336. As an example, such signals may be associated with a satellite-based system that includes one or more satellites 352 and 338. As an example, the satellite 338 may be part of a global positioning system (GPS), which may be implemented to record position, speed, direction, and other parameters of the vessel 322. As an example, one or more satellites, communication equipment, etc. may be configured to provide for VSAT communications, VHF communications, UHF communications, etc.

In the example of FIG. 3, the acoustic receivers 328 may be part of a data acquisition system 326, for example, that may be deployed in borehole 330 via one or more of a variety of delivery systems, such as wireline delivery systems, slickline delivery systems, and other suitable delivery systems. As an example, the acoustic receivers 328 may be communicatively coupled with processing equipment 358, which may be positioned at a downhole location. By way of example, processing equipment 358 may include a telemetry system for transmitting data from acoustic receivers 328 to additional processing equipment 362 located at the surface, e.g., on the rig 350 and/or vessels 322. As an example, information acquired may optionally be transmitted (see, e.g., signals 359).

Depending on the specifics of a given data communication system, examples of surface processing equipment 362 may include a radio repeater 360 and/or one or more of a variety of other and/or additional signal transfer components and signal processing components. The radio repeater 360 along with other components of processing equipment 362 may be used to communicate signals, e.g., UHF and/or VHF signals, between vessels (e.g., the vessel 322 and one or more other vessels) and the rig 350, for example, to enable further communication with downhole data acquisition system 326.

As an example, the acoustic receivers 328 may be coupled to the surface processing equipment 362 via one or more wire connections; noting that additionally or alternatively wireless and/or optical connections may be employed.

As an example, the surface processing equipment 362 may include a synchronization unit, for example, to assist with coordination of emissions from one or more sources (e.g., optionally dithered (delayed) source arrays). As an example, coordination may extend to one or more receivers (e.g., consider the acoustic receivers 328 located in borehole 330). As an example, a synchronization unit may use coordinated universal time, optionally employed in cooperation with a global positioning system (e.g., to obtain UTC data from GPS receivers of a GPS system).

FIG. 3 illustrates examples of equipment for performing seismic profiling that can employ simultaneous or near-simultaneous acquisition of seismic data. By way of example, the seismic profiling may include three-dimensional vertical seismic profiling (VSP) but other applications may utilize rig/offset vertical seismic profiling or seismic profiling employing walkaway lines. As an example, an offset source may be provided by the source 324 located on the rig 350, on the vessel 322, and/or on another vessel or structure (e.g., stationary and/or movable from one location to another location).

As an example, a system may employ one or more of various arrangements of a source or sources on a vessel(s) and/or a rig(s). As shown in the example of FIG. 3, the acoustic receivers 328 of downhole acquisition system 326 are configured to receive the source signals, at least some of which are reflected off a reflection boundary 364 located beneath a sea bottom 366. The acoustic receivers 328 may generate data streams that are relayed uphole to a suitable processing system, e.g., the processing system 362.

While the acoustic receivers 328 may generate data streams, a navigation system may determine a real-time speed, position, and direction of the vessel 322 and also estimate initial shot times accomplished via signal generators 354 of the appropriate source 324 (e.g., or source array). A source controller may be part of the surface processing equipment 362 (e.g., located on the rig 350, on the vessel 322, or at other suitable location) and may be configured with circuitry that can control firing of acoustic source generated signals so that the timing of an additional shot time (e.g., optionally a shot time via a slave vessel) may be based on an initial shot time (e.g., a shot time via a master vessel) plus a dither value.

As an example, a synchronization unit of, for example, the surface processing equipment 362, may coordinate firing of dithered acoustic signals with recording of acoustic signals by the downhole acquisition system 326. A processor system may be configured to separate a data stream of the initial shot and a data stream of the additional shot via a coherency filter. As an example, an approach may employ simultaneous acquisition and/or may not perform separation of the data streams. In such cases, the dither may be effectively zero.

After an initial shot time at T=0 (T0) is determined, subsequent firings of acoustic source arrays may be offset by a dither. The dithers may be positive or negative and sometimes created as pre-defined random delays. Use of dithers facilitates the separation of simultaneous or near-simultaneous data sets to simplify the data processing. The ability to have acoustic source arrays fire in simultaneous or near-simultaneous patterns reduces the overall amount of time used for three-dimensional vertical seismic profiling source acquisition. This, in turn, may reduce rig time. As a result, the overall cost of the seismic operation may be reduced, rendering the data intensive process much more accessible.

If acoustic source arrays used in the seismic data acquisition are widely separated, the difference in move-outs across the acoustic receiver array of the wave fields generated by the acoustic sources can be sufficient to obtain a relatively clean data image via processing the data. However, even when acoustic sources are substantially co-located in time, data acquired in a method involving dithering of the firing times of the individual sources may be processed to a formation image. For example, consider taking advantage of the incoherence of the data generated by one acoustic source when seen in the reference time of another acoustic source.

Also shown in FIG. 3 is an inset example of a zero-offset vertical seismic profile (VSP) scenario 390. In such an example, an acquisition geometry may be limited to an ability to position equipment that is physically coupled to the rig 350. As shown, for given the acquisition geometry, there may be no substantial offset between the source 324 and bore 330. In such an example, a zero-offset VSP may be acquired where seismic waves travel substantially vertically down to a reflector (e.g., the layer 364) and up to the receiver 328, which may be a receiver array. Where one or more vessels are employed (e.g., the vessel 322), one or more other types of surveys may be performed. As an example, a three-dimensional VSP may be performed using a vessel.

Figure 4:
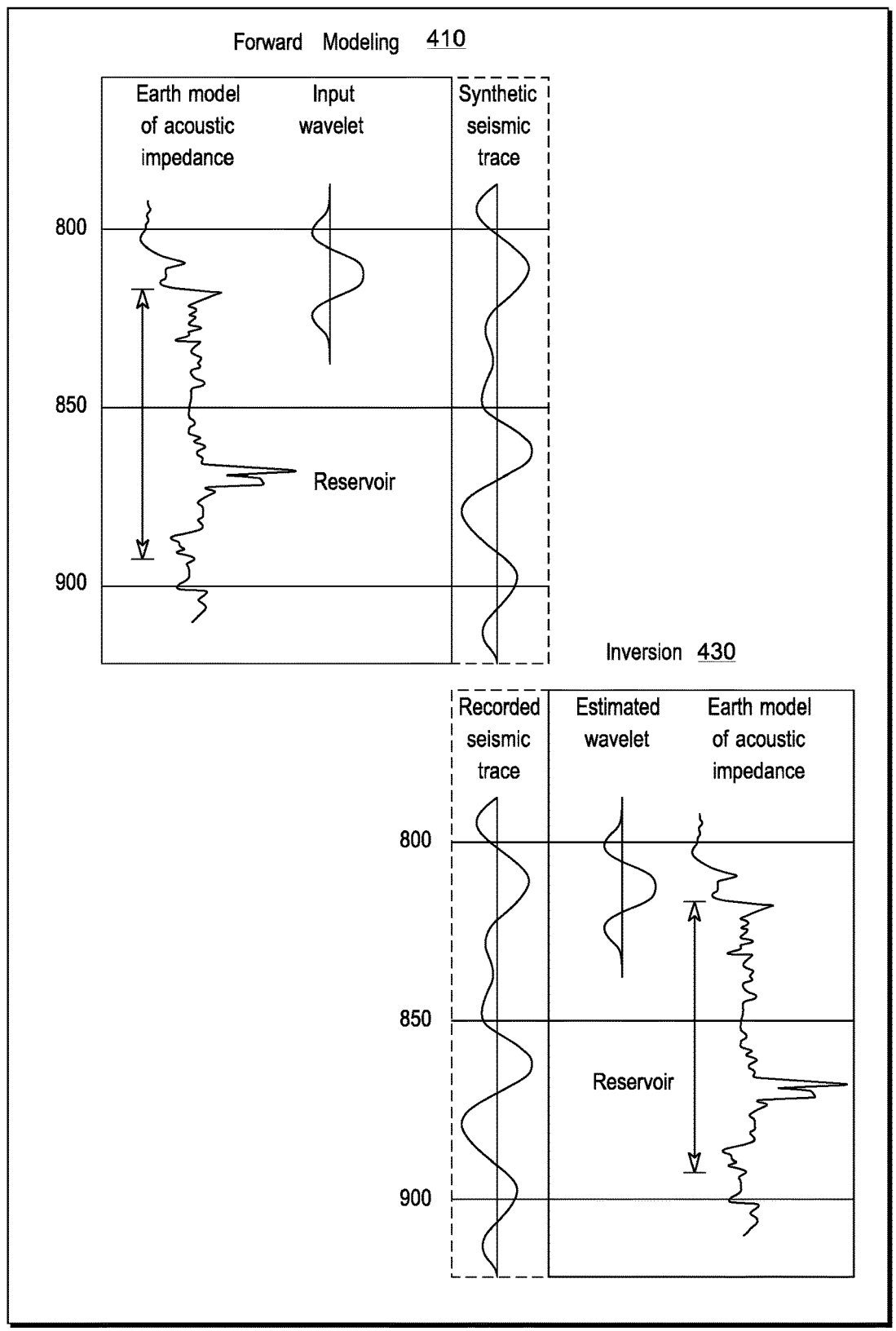
FIG. 4 illustrates examples of methods.

FIG. 4 shows an example of forward modeling 410 and an example of inversion 430 (e.g., an inversion or inverting). As shown, the forward modeling 410 progresses from an earth model of acoustic impedance and an input wavelet to a synthetic seismic trace while the inversion 430 progresses from a recorded seismic trace to an estimated wavelet and an Earth model of acoustic impedance. As an example, forward modeling can take a model of formation properties (e.g., acoustic impedance as may be available from well logs) and combine such information with a seismic wavelength (e.g., a pulse) to output one or more synthetic seismic traces while inversion can commence with a recorded seismic trace, account for effect(s) of an estimated wavelet (e.g., a pulse) to generate values of acoustic impedance for a series of points in time (e.g., at a series of depths).

As an example, a method may employ amplitude inversion. For example, an amplitude inversion method may receive arrival times and amplitude of reflected seismic waves at a plurality of reflection points to solve for relative impedances of a formation bounded by the imaged reflectors. Such an approach may be a form of seismic inversion for reservoir characterization, which may assist in generation of models of rock properties. Results that characterize a reservoir may be utilized, at least in part, to perform one or more actions in the field. For example, one or more pieces of equipment may be operated based on one or more properties of rock, etc. Such operations may include, for example, one or more of drilling, completions, injecting, producing, fracturing, etc.

As an example, an inversion process can commence with forward modeling, for example, to provide a model of layers with estimated formation depths, thicknesses, densities and velocities, which may, for example, be based at least in part on information such as well log information. A model may account for compressional wave velocities and density, which may be used to invert for P-wave, or acoustic, impedance. As an example, a model can account for shear velocities and, for example, solve for S-wave, or elastic, impedance. As an example, a model may be combined with a seismic wavelet (e.g., a pulse) to generate a synthetic seismic trace.

Inversion can aim to generate a "best-fit" model by, for example, iterating between forward modeling and inversion while seeking to minimize differences between a synthetic trace or traces and actual seismic data.

As an example, a framework such as the ISIS inversion framework (Schlumberger Limited, Houston Texas) may be implemented to perform an inversion. As an example, a framework such as the Linearized Orthotropic Inversion framework (Schlumberger Limited, Houston, Texas) may be implemented to perform an inversion.

As an example, seismic data may be processed in a technique called "depth imaging" to form an image (e.g., a depth image) of reflection amplitudes in a depth domain for a particular target structure (e.g., a geologic subsurface region of interest). An image formed by depth imaging may be rendered to a display where a user may interpret the target structure using one or more features of a framework, which may provide for analyzing the image (e.g., image data) in an automated or semi-automated manner. Such a framework can include instructions to render one or more graphical user interfaces to a display where a user may manipulate one or more input devices operatively coupled to a computer or computing system to interact with the framework. As an example, a framework can provide for image analysis that can analyze a depth image or depth images to more particularly identify the shape, the boundary, the make-up, etc. of one or more subterranean features (e.g., rock, fluid, etc.). A target structure may be, for example, a reservoir that includes hydrocarbons where the boundary of hydrocarbons may be discerned via interactions with a framework, for example, as part of a workflow that may include identifying a region that include hydrocarbons, drilling a well to that region, and producing at least a portion of the hydrocarbons from the region via the well (e.g., as appropriated completed, etc.).

As an example, seismic data may be processed to obtain an elastic model pertaining to elastic properties of a geologic subsurface region. For example, consider elastic properties such as density, compressional (P) impedance, compression velocity ($v_p$)-to-shear velocity ($v_s$) ratio, anisotropy, etc. As an example, an elastic model can provide various insights as to a surveyed region's lithology, reservoir quality, fluids, etc.

An earthen formation can include layers of media (e.g., rock, etc.) where elasticity of the media may be isotropic, anisotropic or isotropic in certain aspects and anisotropic in others. As an example, crustal rock may be anisotropic yet transversely isotropic "TI" (e.g., locally polar anisotropic). Knowledge of isotropy, anisotropy, etc. can assist with, for example, planning and execution of exploration and development operations of a reservoir or reservoirs within a formation.

As mentioned, parameters that can characterize anisotropy of media (e.g., seismic anisotropy) can include one or more of the Thomsen parameters $\varepsilon$, $\delta$ and $\gamma$ (see, e.g., Thomsen, 1986).

Elastic properties of various types of rock may be approximated by so-called Vertical Transverse Isotropy (VTI or TI). Physical properties of a VTI material may be theoretically approximately identical when measured with respect to a direction known as the symmetry axis. In the case of many sedimentary rocks layering tends to be horizontal and the resulting symmetry axis is vertical. For such a system, the elastic stiffness tensor can be described using five elastic coefficients: $C_{11}$, $C_{33}$, $C_{44}$, $C_{66}$ and $C_{13}$. The foregoing five elastic coefficients correspond to coefficients of the stress tensor given a so-called "compact representation" (e.g., Voigt compact representation). As an example, a number of elastic coefficients may be selected based at least in part on type of anisotropy where, for example, the number may differ from five.

As an example, a workflow (e.g., a method or methods) can include use of a 5 parameter TI model and/or use of one or more other multi-parameter anisotropy models. For example, consider a symmetry such as orthorhombic, which can involve a larger number of parameters (e.g., up to 21) for triclinic. As an example, a workflow can be performed to obtain values of 9 independent parameters describing an orthorhombic system or, for example, to obtain 21 parameters describing a triclinic system. As an example, a workflow can include using one or more types of multi-parameter anisotropy models where the workflow includes combining velocity measurements with prior information on elastic properties to obtain substantially continuous (anisotropic) elastic properties as a function of depth.

In the foregoing example, the five elastic coefficients describe velocity variation for three different wave types, the quasi compressional wave (qP), the quasi shear wave polarized in the vertical plane (qSV) and a true shear wave polarized in the horizontal plane (SH). The behavior of the qP and qSV waves is controlled by the $C_{11}$, $C_{33}$, $C_{44}$ and $C_{13}$ elastic coefficients, which may be referred to as parameters of a formation (e.g., or properties of a formation). As to behavior of a SH wave, it is controlled by values of the coefficients $C_{44}$ and $C_{66}$, which may be referred to as parameters of a formation (e.g., or properties of a formation). As explained in Thomsen (1986), the Thomsen parameter g may be defined in terms of $C_{44}$ and $C_{66}$.

As an example, a method may be implemented within and/or in a manner operatively coupled to a framework such as, for example, the TECHLOG® framework (e.g., sonic TI characterization, geomechanics, acoustics, etc.).

As an example, a method may be applied to data acquired via wireline sonic (e.g., dipole) technology. As an example, a method may be part of an interpretation workflow, for example, implemented at least in part by an interpretation framework. As an example, a wireline dipole sonic tool (e.g., SONIC SCANNER® tool, THRUBIT® dipole tool, etc.) may be utilized as part of a workflow, for example, in a workflow for interpretation of processed sonic data acquired in one or more anisotropic environments.

As an example, a method can include receiving borehole sonic data (e.g., compressional, dipole fast and slow shear, and optionally Stoneley shear) as acquired at one or more of a range of well deviations relative to bedding and inverting at least a portion of such input data to arrive at a substantially continuous description of five transversely isotropic (TI) elastic properties of an encountered formation or formations (e.g., elastic parameters); or, for another type of anisotropy, an appropriate number of elastic properties (e.g., elastic parameters) may be output (e.g., substantially continuous with respect to depth, etc.).

As an example, a workflow can be probabilistic, for example, in comparison to a deterministic workflow. For example, probabilistic can mean that a workflow can generate a probability distribution of possible outcomes. Such a probabilistic approach can allow for the use of prior information to guide an inversion where prior information can include information in a database of core measurements from a particular field, basin, client, etc. (e.g., consider information in a database that includes one or more data storage devices accessible via one or more interfaces, which may include one or more network interfaces).

As an example, a method may be applied in the context of geomechanics and seismic processing and interpretation in anisotropic environments. As an example, a method may be applied to a sonic dataset in a manner that decreases opportunities for errors and bias during interpretation (e.g., choice of inappropriate models, inconsistencies between different wells from the same operator). As an example, a method may "bridge a gap" between slownesses acquired in anisotropic environments and anisotropic elastic properties.

In an Appendix A, information on elastic anisotropy in TI media is presented while in Appendix B information on elastic wave propagation in the presence of TI elastic anisotropy is presented. As mentioned, one or more other types of anisotropy media may be considered where, for example, an appropriate type and number of elastic parameters may be selected (e.g., consider orthorhombic media, etc.). As an example, notation may be a user selectable feature of a framework that can estimate elastic parameters via inversion and optionally with probability information.

A medium is anisotropic if its properties depend on the direction in which these properties are measured. A particular type of anisotropy is referred to as elastic anisotropy. An example of elastic anisotropy is the compressional velocity of shale formations, which is often found to be greater when measured in the direction parallel to the shale bedding than when measured orthogonal to the shale bedding. In terms of elastic properties, shales may be in part characterized by using the so-called transversely isotropic (TI) model known from elasticity theory; noting that such a model may be referred to as a transverse isotropy (TI) model. As an example, shale can be an anisotropic formation (e.g., an anisotropic region) in a subterranean environment.

A TI medium may be described by five independent elastic constants, where their notation can depend on a user of these constants. For instance, in the seismic domain the so-called Thomsen notation may be utilized (e.g., $V_{P0}$, $V_{S0}$, $\epsilon$, $\delta$, $\gamma$) whereas the same shale properties may be formulated in terms of mechanical properties (e.g., vertical and horizontal Young's moduli and Poisson ratios plus a shear modulus) by a geomechanics engineer. Meanwhile, a sonic processor may have more affinity with the so-called Cij-notation ($C_{11}$, $C_{13}$, $C_{33}$, $C_{44}$ and $C_{66}$)) or so-called Voigt compact representation. While the choice of notation may differ from domain to domain, the physical properties of the shale tends to remain the same.

Another type of anisotropic medium is an orthorhombic medium (e.g., orthotropic symmetry). Such a medium or media may be present in fractured reservoirs. In a Cij-notation, an orthorhombic medium can be represented using, for example, nine independent elastic parameters: $C_{11}$, $C_{12}$, $C_{22}$, $C_{13}$, $C_{23}$, $C_{33}$, $C_{44}$, $C_{55}$ and $C_{66}$. An orthorhombic stiffness tensor can be formulated using the foregoing Cij-notation. Another notation can be formulated for an orthorhombic medium that considers the Christoffel equation as having the same form in the symmetry planes of orthorhombic and transversely isotropic (TI) media, where the stiffness coefficients are replaced by two vertical (P and S) velocities and seven dimensionless parameters that represent an extension of Thomsen's anisotropy coefficients to orthorhombic models, for example, to provide a uniform description of anisotropic media with both orthorhombic and TI symmetries (Tsvankin, 1997). In such an approach, a reduction can be made in the number of parameters responsible for P-waves in orthorhombic media, which can depend on the vertical velocity ($V_{P0}$) and five anisotropic parameters (e.g., with $V_{P0}$ serving as a scaling coefficient in homogeneous media). Where orthorhombic anisotropy is present, or otherwise considered for analysis, a method can include selecting a number of parameters that corresponds to orthorhombic anisotropy, which, as explained above, can differ from another type of anisotropy. Various equations illustrated for TI anisotropy may be appropriately adapted for another type of anisotropy such as, for example, orthorhombic anisotropy.

As an example, a geologic environment can include an anisotropic formation with orthorhombic anisotropy due at least in part to a combination of vertical cracks and vertical transverse isotropy in the background medium. As an example, orthorhombic symmetry can also be caused by two or three mutually orthogonal crack systems or, for example, two substantially identical systems of cracks making an arbitrary angle with each other.

As an example, an approach can include utilizing a formulation in terms of nine parameters that define orthorhombic anisotropy: $V_{P0}$, $V_{S0}$ (the vertical velocities of qP-wave and qS-wave along the principal axis ($x_3$); $\varepsilon_1$, $\delta_1$, $\gamma_1$ (Vertically Transverse Isotropic (VTI) parameters in the symmetry plane $x_2$-$x_3$); $\varepsilon_2$, $\delta_2$ and $\gamma_2$ (VTI parameters in the symmetry plane $x_1$-$x_3$); and $\delta_3$ (VTI parameter in the symmetry plane $x_1$-$x_2$); where $x_1$, $x_2$, and $x_3$ denote a Cartesian coordinate system (Kainkaryam et al., 2015). In such an approach, an orthorhombic medium may be a tilted orthorhombic medium.

As an example, a method can include characterizing a geologic environment where one or more formations include lower orders of symmetry such as, for example, tilted layers relative to an earth frame of reference, under differential stress, and presence of natural fractures which may not be in the same symmetry plane as either the present-day stress or bedding planes.

As an example, a method can include characterizing an anisotropic formation where such a characterization includes probability information. For example, a method can include inverting for values that characterize an anisotropic formation and can include providing probability information for at least a portion of the values. Such a method may utilize prior information (e.g., from one or more sources), such a method may be at least in part probabilistic, such a method may be directed to a single well (e.g., bore) and such a method may be relatively continuous where, for example, values that characterize an anisotropic formation span a length of the single well (e.g., per sampling intervals of measurements taken in the well by one or more tools). As an example, information may be plotted and rendered to a display as part of a graphical user interface (GUI). In such an example, the information may be plotted with respect to depth where a series of values may represent estimates of a particular elastic parameter and where a series of values or series of values can represent probability information where one series may be generally of lesser values and another series may be generally of greater values such that a single plot may include three series where two of the series represent probability information that can be utilized to assess a "middle" series at one or more depths (see, e.g., FIG. 8).

As to anisotropy of a formation or formations, it may include TI and/or one or more other types of anisotropy (e.g., fracture-related, tilted TI (TTI), orthorhombic, a combination of types, etc.). One or more types of anisotropy may be associated with anisotropy parameters. For example, TI media may be associated with transverse isotropy parameters, orthorhombic media may be associated with orthorhombic anisotropy parameters, etc. As an example, a method can include anisotropy parameter estimation (e.g., estimation of values of anisotropic parameters). Such a method may optionally implement one or more anisotropic models of a formation or formations. As an example, a method can include associating one or more anisotropic parameters and structural feature orientation (e.g., for fractures, etc.).

Seismic anisotropy can be used to describe the directional dependence of the velocity of seismic waves in a medium (e.g., rock) within a geologic environment. Seismic anisotropy can be associated with shear wave splitting. For example, shear waves have been observed to split into two or more fixed polarizations which can propagate in a particular ray direction when entering an anisotropic medium.

As an example, a method can include acquiring seismic data via one or more seismic surveys. As an example, a method can include acquiring data via a tool disposed in a bore where the bore may be deviated. For example, consider acquiring sonic data via a sonic logging tool disposed in a deviated bore (e.g., a deviated well) at a plurality of positions along an axis of the deviated bore. In such an example, the positions may be measured as depth and/or length. For example, in a substantially horizontal bore, depth with respect to an uppermost surface of a geologic environment may be substantially constant while length along the horizontal bore may be utilized to mark acquired data.

As an example, a workflow may include seismic migration and inversion. Such a workflow may include considering one or more anisotropies of one or more formations. For example, consider including orthorhombic anisotropy where a workflow includes receiving wide azimuth data (WAZ or WAz). WAZ involves seismic data acquisition where, for example, separate source vessels are used to record seismic reflections from areas out to the side of a recording spread (e.g., two or more vessels used simultaneously to increase the range of azimuths and offsets available for each shot gather in processing). As an example, WAZ data from a survey can provide for P-wave fracture characterization for a fractured reservoir and/or geomechanical studies around planned deepwater well locations as WAZ acquisition allows for application of amplitude variation with azimuth (AVAZ) techniques for processing and interpretation. WAZ surveying may be applied to an area of complex structural geology or where certain types of velocity contrasts exist (e.g., where salt causes imaging problems). WAZ may be suitable for areas in the Gulf of Mexico, the Aptian salt basin of the west coast of Africa, offshore Indonesia, the Red Sea, Brazil, etc.

As an example, a method can include inversion for fracture characterization. For example, a method can provide equations for an orthotropic system of symmetry that is appropriate for analysis of vertical transverse isotropy (anisotropic) rock layers that include swarms of aligned vertical fractures (Narhari et al., 2014). Such an approach may include receiving full-azimuth seismic data. A seismic wave passing through a set of oriented fractures can undergo velocity variation and amplitude variation that varies with azimuth (VVAz and AVAz, respectively), which may be referred to as azimuthal anisotropy. As an example, an inversion may be performed that outputs values for anisotropy parameters that can be related to fractures (e.g., fracture density, orientation of a fracture symmetry axis, etc.) and that outputs probability information for the values.

Elastic anisotropy is relevant to various workflows in geomechanics and/or seismic domains. In geomechanical applications, presence and amount of elastic anisotropy can impact in-situ stress calculations which are used directly in drilling, completion and reservoir management. The continuous stress and mechanical property profiles can be part of a geomechanics workflow for 1D or 3D models. Failure to account for elastic anisotropy in geomechanics may lead to inefficient stimulation, cap rock failure during injection or enhanced oil recovery or stuck drill strings and lost borehole assemblies. In the geophysics domain, the presence of elastic anisotropy can present an issue in seismic inversion. Processing that fails to take anisotropy into account can yield biased estimates of subsurface velocity, consequently resulting in mistimes in time-to-depth conversion. In depth imaging, seismic anisotropy can have an influence on the focusing and positioning of migrated reflection events.

In general, continuous measurements of anisotropic parameters are not available in practice for geologic environments as to oil and/or gas production. In the absence of such measurements, the geomechanics domain tends to rely on models and core measurements, while the seismic domain can attempt to extract the relevant anisotropic parameters from the borehole and surface seismic data (traveltimes) itself. The (continuous) borehole measurement that comes closest to anisotropy characterization, is borehole sonic.

During borehole sonic acquisition, waveforms from various source types can be recorded and subsequently processed in order to obtain formation properties such as the compressional and shear slowness (1/velocity). Slowness may be considered to be a type of velocity or an inverse velocity. If a borehole is drilled through an anisotropic formation, then these slownesses can depend on the orientation of the wellbore relative to the formation as well as on the anisotropic properties of that formation, in a manner that tends to be understood. For a given angle of a wellbore relative to a formation, current sonic logging technology tends to yield, at most, four independent slowness measurements: the compressional slowness, the dipole fast and the dipole slow shear slowness, and finally the Stoneley shear slowness.

While the theoretical relationships between the slownesses measured and the TI anisotropic parameters desired, may be known, a problem arises in that the number of independent measurements (e.g., consider four, at most in such an example) is less than the number of anisotropic properties (e.g., which can be five, assuming transverse isotropy as a type of anisotropy). In addition, for a given set of slowness measurements at a particular depth and orientation, the inherent measurement uncertainties imply that it is likely not possible to find a single set of TI parameters which, when used to calculate theoretical slownesses, would result in a perfect match with the available measurements.

As an example, a method can obtain five (independent) TI anisotropic parameters from a set of velocity measurements, taking into account measurement uncertainty. Such an approach can offer a solution for an under-determined problem (e.g., more unknowns than independent measurements).

As an example, an approach may be applied to data from various well deviations (e.g., not restricted to vertical or horizontal well scenarios.

As an example, a method can obtain a selected number of (independent) anisotropic parameters from a set of velocity measurements, taking into account measurement uncertainty. Such an approach can offer a solution for an under-determined problem (e.g., more unknowns than independent measurements). As to the number of (independent) anisotropic parameters, the number may be selected based at least in part on type of anisotropy under consideration. As an example, an approach may be applied to data from various well deviations (e.g., not restricted to vertical or horizontal well scenarios.

As an example, borehole sonic slownesses, density and orientation ("relative dip") can be combined with prior information coming from, for instance, laboratory core data (e.g., as may be accessible via a database, etc.), in order to arrive at a continuous description of the five independent TI properties across the interval where sonic data was acquired. Such an approach can be probabilistic in nature, meaning it can deal with measurement uncertainty while yielding a range of most probable results given the input data and prior information. Instead of imposing strict relationships between TI constants, prior information can provide correlations (co-variances) resulting in certain combinations of TI parameters to be more probable than others. As mentioned, one or more other types of anisotropy may be considered where the number of independent properties may differ from the five associated with TI anisotropy.

While various examples refer to single-well datasets, a workflow may be used on sonic datasets acquired in multiple wells, for example, in cases where the formations between the wells are laterally continuous and homogeneous and/or in cases where the sonic data has been appropriately clustered to mitigate the effects of formation heterogeneity on sonic velocities. As an example, a workflow may be applied on data acquired in a single well at different depths, where the interval covered by the sonic data spans a homogeneous formation.

As an example, use of prior information can constrain an inversion and allow for a method to proceed without having to combine sonic data between wells or from different depths.

As an example, a method can include referencing one or more lookup tables, for example, to estimate group velocities. In such an example, one or more lookup tables may be generated once for a range of group propagation directions and for a number of anisotropy models (e.g., TI, orthorhombic, etc.). Such lookup tables may be repeatedly used for inversion of sonic data at individual depth levels as well as, for example, during individual iterations at a single depth. As an example, interpolation may be utilized as to lookup table entries to obtain improved estimates of the group velocities. A lookup table may be, for example, a data structure stored in a storage device that is accessible via one or more interfaces. As an example, a database may include various data structures where one or more of the data structures may be in the form of a lookup table.

As an example, a method can include using core data for the purpose of anisotropy characterization, for example, in a probabilistic framework by using the statistical properties of the core data (e.g., means and covariances). As an example, rather than introducing dependencies by forcing a particular TI constant to be some function of a set of other TI constants, a method can include assigning a higher probability to some combinations of TI constants as compared to other combinations, without imposing strict relationships. As an example, such an approach may be applied to a type of anisotropy other than TI. As an example, while mean and variance (e.g., covariance) are mentioned, one or more other statistical metrics may be utilized. Arithmetic means and (co-)variances can be considered to be properties of so-called (multi-variate) normal distributions; noting that other types of (probability) distributions may be utilized as part of a workflow that includes inversion.

As an example, a method can include assuming that input velocities correspond to actual (far-field) formation properties, free of dispersion effects.

As an example, a method can include inverting for the five independent parameters of elastic, transversely isotropic (TI) media on the basis of sonic slowness measurements and prior information as to statistical means and (co-) variances of the five independent parameters. Some examples of sources of prior information include, for example, one or more of laboratory measurements of dynamic or static elastic properties derived from core acquired in the well, TI property curves from offset wells, or a database of core results, for instance corresponding to a particular basin (e.g., consider Eagle Ford, etc.) or rock type (e.g., "argillaceous shale", etc.). While TI media is mentioned, as explained, one or more other types of anisotropy may be considered in a method that can output anisotropy parameter values (e.g., elastic parameter values).

Figure 5:
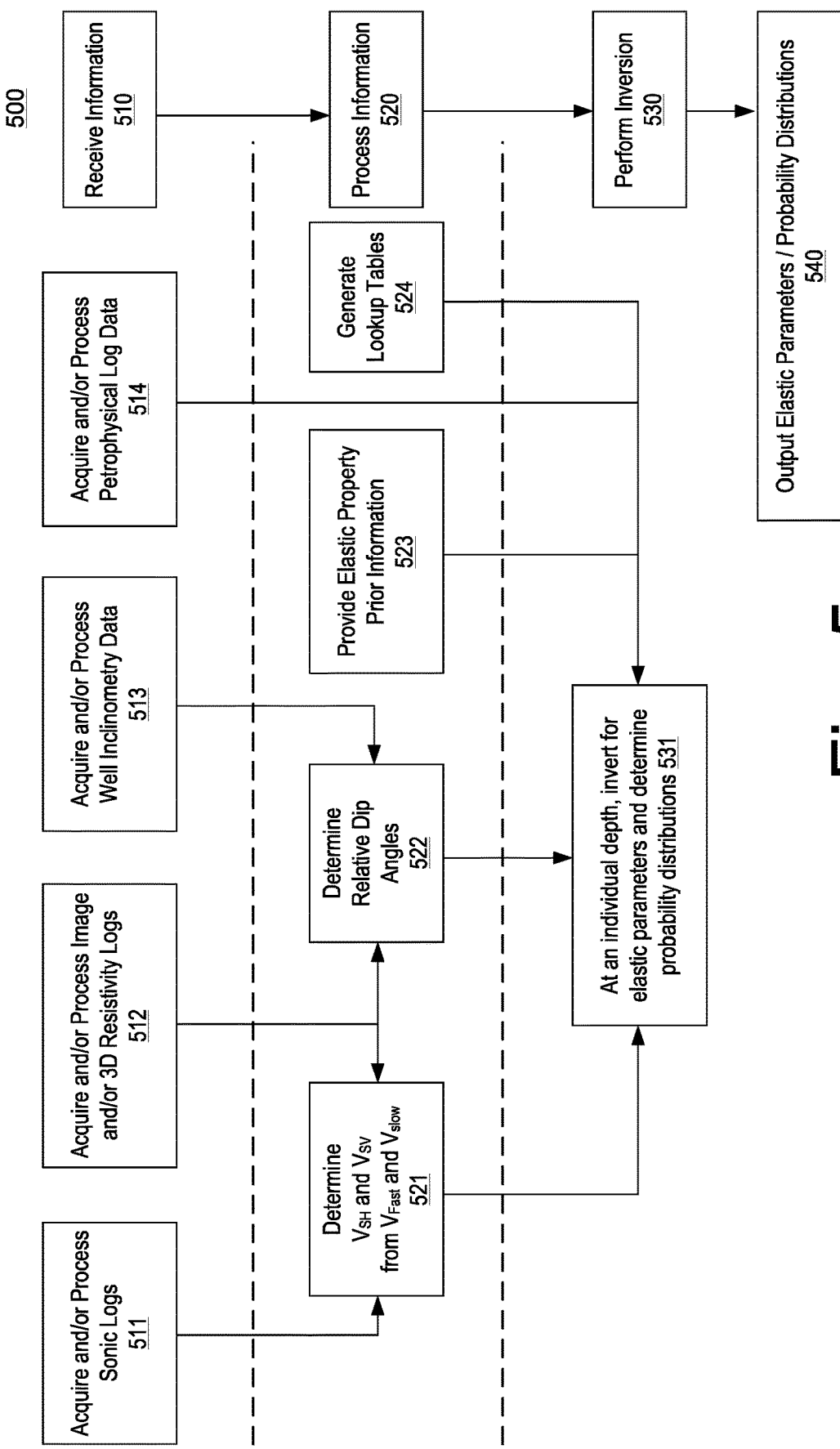
FIG. 5 illustrates an example of a method.

FIG. 5 shows an example of a method 500. In the example of FIG. 5, the method 500 can include a reception block 510 for receiving information that includes elastic property information and that includes sonic data acquired via a tool disposed at a plurality of depths in a bore in a subterranean environment that includes at least one anisotropic formation; a process block 520 for processing the information to generate processed information where the processed information includes variance information associated with the elastic property information and where the processed information includes velocity information and orientation information associated with the sonic data; a performance block 530 for performing an inversion based at least in part on the processed information; and an output block 540 for outputting values for elastic parameters based at least in part on the inversion. As shown in FIG. 5, the output block 540 may output one or more probability distributions.

The method 500 of FIG. 5 may be implemented via a system. For example, one or more of the blocks 510, 520, 530 and 540 may include processor-executable instructions stored in memory of a system. In such an example, a system can include a processor; memory accessible by the processor; and processor-executable instructions stored in the memory that are executable to instruct the system to: receive information that includes elastic property information and that includes sonic data acquired via a tool disposed at a plurality of depths in a bore in a subterranean environment that includes at least one anisotropic formation; process the information to generate processed information where the processed information includes variance information associated with the elastic property information and where the processed information includes velocity information and orientation information associated with the sonic data; perform an inversion based at least in part on the processed information; and output values for elastic parameters based at least in part on the inversion. In such an example, the values for the elastic parameters can be values that define a substantially continuous description for each of the elastic parameters with respect to depth. For example, where the sonic data are acquired at individual depths over a length of the bore, the elastic parameters may be output in a substantially continuous manner for the individual depths. As an example, sonic data may be acquired according to a sampling rate, which may be based on depth, velocity of a tool in a bore, etc. In such an example, a method and/or a system can output values for elastic parameters at positions (e.g., depths) that correspond to samples of sonic data acquired according to the sampling rate (e.g., or sampling rates).

As an example, one or more computer-readable storage media can include computer-executable instructions to instruct a system to: receive information that includes elastic property information and that includes sonic data acquired via a tool disposed at a plurality of depths in a bore in a subterranean environment that includes at least one anisotropic formation; process the information to generate processed information where the processed information includes variance information associated with the elastic property information and where the processed information includes velocity information and orientation information associated with the sonic data; perform an inversion based at least in part on the processed information; and output values for elastic parameters based at least in part on the inversion.

In the example of FIG. 5, various additional blocks are illustrated that may correspond to particular actions that may be taken by one or more of the blocks 510, 520, 530 and 540. As to the reception block 510, it may provide for data acquisition and some amount of pre-processing of borehole sonic, image and petrophysical logs coming from wireline or logging-while-drilling (see, e.g., blocks 511, 512, 513, and 514); as to the process block 520, it may provide for data preparation, which can include calculation of the relative dip, transformation of dipole fast and slow shear to SH and qSV shear slownesses, calculation of the statistical means and covariances of the provided prior information, and preparation of the lookup tables for the qP and qSV group velocities as well as for the Stoneley shear velocity (see, e.g., blocks 521, 522, 523, and 524); and as to the performance block 530, it may provide for, at individual depths, using prior statistical properties in a Bayesian-type inversion of borehole sonic data to obtain relatively continuous TI elastic parameter curves (e.g., substantially continuous as to sampling, etc.) (see, e.g., a block 531). The probabilistic nature of such an approach can provide a quantitative assessment of inversion result uncertainties. As shown, the workflow 500 can include the output block 540 for outputting information. For example, output information can include values that may be values that define one or more continuous TI elastic parameter curves (e.g., one or more elastic parameter curves as shown via various plots in FIG. 8).

In the example of FIG. 5, the block 511 is an acquisition and/or process block for sonic logs, the block 512 is an acquisition and/or process block for image and/or 3D resistivity logs, the block 513 is an acquisition and/or process block for well inclinometry data, and the block 514 is an acquisition and/or process block for petrophysical log data.

In the example of FIG. 5, the block 521 is a determination block for velocities, the block 522 is a determination block for relative dip angles (e.g., one or more types of orientation information), the block 523 is a provision block for information (e.g., accessing and/or receiving information), and the block 524 is a generation block for one or more lookup tables (LUTs). As an example, the block 523 may provide for calculation of variance information associated with received elastic property information, as may be received by the reception block 510.

As to the block 522, as mentioned, dip may be orientation information, which may be specified as an angle and/or other metric. As an example, one or more types of structures (e.g., structural features) may be described at least in part by orientation information. For example, one or more fractures may be described at least in part by orientation information, which may be an angle and/or one or more other metrics. As an example, fracture orientations may be specified via a diagram such as a rose diagram, which may be generated from digital data stored in a file, etc. As an example, a structural feature may be specified by position and orientation at one or more positions. As an example, a structural feature may be specified by a position with respect to a bore (e.g., a well) and one or more orientation metrics (e.g., one or more angles, etc.). As an example, a borehole image may be a digital image that can be processed and analyzed as to one or more structural features, which may provide orientation information as a result (see, e.g., the blocks 512 and 513 of FIG. 5).

In the example of FIG. 5, the block 531 can, for example, at an individual depth, invert for elastic parameters and determine probability distributions. The block 531 can be an inversion block that can invert and determine probability information associated with various elastic parameters. As shown in FIG. 5, the block 531 can receive information from the blocks 514, 521, 522, 523 and 524; where information is indirect as to the blocks 511, 512 and 513 being processed for determinations of the blocks 521 and 522. The block 531 can output information as indicated by the block 540.

In the example of FIG. 5, one or more approaches may be implemented as to anisotropy of a formation or formations that exist in a subterranean environment. As mentioned, a formation may include TI, orthorhombic and/or one or more other types of symmetry. An approach may formulate equations in one or more manners based at least in part on type or types of anisotropy (e.g., TI, orthorhombic, etc.).

The blocks of FIG. 5 may be implemented, for example, at least in part via processor-executable instructions stored in a computer-readable storage medium or media (see, e.g., the instructions 270 of FIG. 2).

As an example, a workflow can be a method that includes a reception block for receiving information that includes sonic data (see, e.g., 510); a processing block for processing the information to generate processed information (see, e.g., 520); a performance block for performing an inversion based at least in part on the processed information (see, e.g., 530); and an output block for outputting values for elastic parameters based at least in part on the inversion (see, e.g., 540).

As an example, as output, the workflow 500 of FIG. 5 may generate: continuous (e.g., at the sampling rate of the input sonic logs), complete (five TI parameters), and independent (without model assumptions) record of the TI elastic properties of the formations covered by the logging interval; and continuous inversion result uncertainties that are directly related to the uncertainties of the available input data as well as to the degree of constraint provided by the prior information.

As an example, a workflow may be used for characterization of one or more lower-symmetry systems such as, for example, orthorhombic (nine), monoclinic (twelve), or even triclinic (twenty-one independent constants).

As to the reception block 510, it can include acquisition and processing. As an example, consider acquisition of wireline and/or LWD sonic waveforms, including inclinometry, generated by firing unipole, monopole, dipole and/or quadrupole sources in the borehole; wireline and/or LWD image data (e.g., electrical or ultrasonic), including inclinometry; wireline and/or LWD petrophysical logs (e.g., formation density); well orientation (deviation and azimuth).

As an example, at individual depths, sonic waveforms can be processed to estimate (a combination of) compressional slowness, up to two different dipole shear slownesses (the fast and slow shear slowness) and Stoneley shear slowness.

As an example, a structural interpretation of images can be performed to extract the geometry and morphology of bedding planes and layering. A determination of geometrical properties of the beddings and laminations can include the location and orientation of the ideal-plane representation of the beds and laminations represented by depth, dip angle, and dip azimuth.

As an example, one or more workflows can process petrophysical logs in order to estimate formation properties such as the bulk density of the formation.

As an example, data input can include well orientation (e.g., deviation and azimuth), for example, as a function of depth as may be via an inclinometry tool.

As to the process block 520, it can include data preparation where various inputs are prepared for the subsequent inversion process of the performance block 530.

Example: From Fast/Slow Shear to SH/qSV Shear

The dipole sonic fast and slow shear slownesses are related to the SH-, and qSV-shear slownesses through an analysis based on the orientation of the wellbore, the orientation of the beds and/or laminations, and the sonic fast-shear azimuth (FSA) which is defined as the polarization direction of the fastest of the two shear waves. Establishing the relation between fast and slow shear on the one hand versus SH and qSV on the other hand is useful because the relations used in the subsequent inversion are defined in terms of SH and qSV shear slownesses, not fast and slow shear slownesses (see Appendix B).

Figure 6:
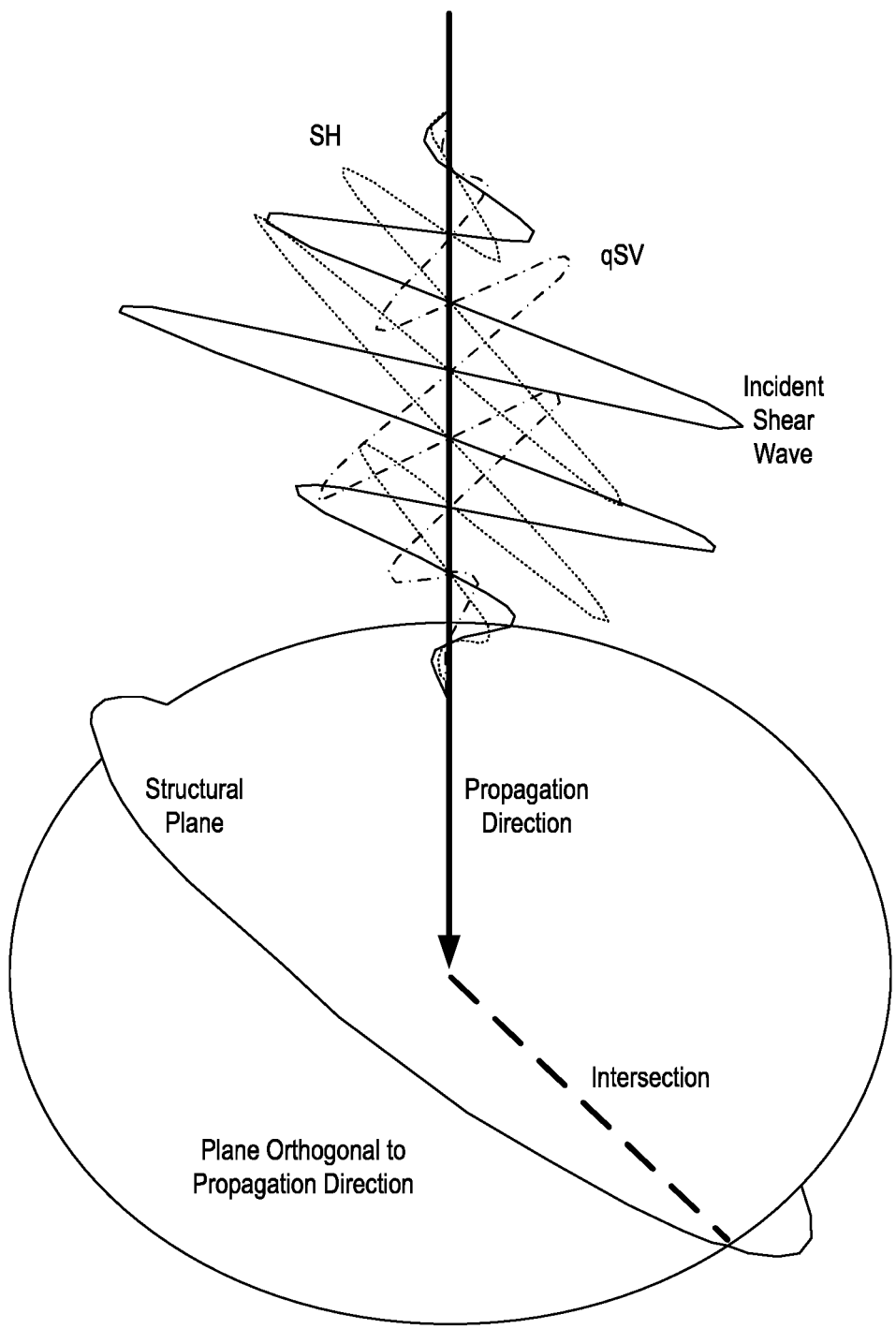
FIG. 6 illustrates an example a graphic.

FIG. 6 shows a schematic illustration of the SH (dotted) and qSV (dashed with dots) shear wave components of a shear wave (solid line) propagating vertically through an inclined structure. In the example of FIG. 6, the SH-shear wave is polarized along the orientation of the intersection (solid thick dashed line) between the bedding/lamination planes with the plane orthogonal to the sonic tool. If the FSA is in the (general) direction of this intersection, then that implies that the SH shear slowness corresponds to the fast shear slowness while the qSV shear slowness corresponds to the slow shear slowness. If the FSA is approximately ninety degrees from the intersection, then the qSV shear slowness is given by the fast shear slowness while the SH shear wave slowness is given by the slow shear slowness.

As shown, an input into the inversion algorithm is the relative dip at which measurements were made. The relative dip is defined as the angle between the wellbore and the TI symmetry axis. For various transversely isotropic systems such as shales and finely laminated formations, the symmetry axis is commonly assumed to be oriented perpendicular to the shale beds or laminations. This implies for instance that a vertical well drilled through horizontal shale beds results in measurements at zero relative dip, while a horizontal well drilled through the same shale will result in measurements made at 90 degrees relative dip. The relative dip can be calculated in a straightforward manner on the basis of knowledge of the well orientation and the bedding/shale/lamination orientation from image interpretation. Instead of using borehole images, the relative dip can also be based on an assumption of the orientation of the bedding relative to the well. For example, in some cases it may be assumed that bedding is flat, and that therefore the relative dip angle is equal to the well deviation.

Example: Prior Information Preparation

Prior information can be utilized for probabilities assigned to one or more parameters and/or to one or more events, for example, in advance of empirical evidence. In the context of a workflow like the workflow 500 of FIG. 5, prior information can be defined as the probability of a single TI parameter magnitude, or the probability of a combination of TI parameter magnitudes, in advance of considering the available measurement data (e.g., sonic slownesses).

The source, type, and value of prior information can vary. For instance, prior information can come from ultrasonic or static measurements of elastic properties on cores acquired in the same borehole in which the other (e.g., sonic, images, and petrophysical) data were also acquired. Alternatively, or additionally, prior information can be based on a public core database or even on a core database from a specific client, basin, or formation type. As another example, anisotropic elastic parameters obtained in an offset well during a previous study can be used as prior information to support the inversion of the current sonic dataset, while prior information may also come from analysis of borehole seismic or surface seismic data. As an example, prior information may be limited to data on a subset of TI parameters (e.g., prior information regarding just four instead of five TI parameters, see one or more examples below).

As an example, prior information may be from one or more images, which may be areal images (e.g., flying vehicle, etc.). For example, an image may exhibit information about one or more structural features in a geologic environment (e.g., horizons, geobodies, fractures, etc.). Such information may be or include orientation information and/or may be processed to generate orientation information.

In preparation for its subsequent use during the inversion of the sonic data, prior information can be analyzed to yield the arithmetic mean and variance of each TI parameter, in addition to the covariances between TI parameters.

As an example, consider the case where prior information includes sets of TI elastic parameters determined by performing static lab measurements on cores. The total number of cores tested is n, and the set of TI elastic properties measured on each core includes four elastic stiffnesses, i.e., $C_{11}$, $C_{13}$, $C_{33}$, and $C_{66}$.

The mean μ of elastic stiffness $C_{11}$ in the prior data is calculated using $$\mu_{C_{11}} = \frac{\sum_{i=1}^{n} C_{11}^{(i)}}{n}$$

(e.g., and similarly for the other three available elastic stiffnesses)

while its variance $\sigma^2$ is given by:

$$\sigma_{C_{11}}^2 = \frac{\sum_{i=1}^{n}(C_{11}^{(i)} - \mu_{C_{11}})^2}{n}$$

(similarly for the other three available elastic stiffnesses). The covariance between $C_{11}$ and $C_{13}$ is calculated using $$\sigma_{C_{11}C_{13}} = \frac{\sum_{i=1}^{n}(C_{11}^{(i)} - \mu_{C_{11}})(C_{13}^{(i)} - \mu_{C_{13}})}{n}$$

(e.g., and similarly for other possible combinations of stiffnesses).

As an example, a covariance matrix can be a useful way of storing the covariances between the various TI parameters in an unambiguous manner. For this particular example, the covariance matrix is defined as:

$$\Sigma = \begin{pmatrix} \sigma_{C_{11}}^2 & \sigma_{C_{11}C_{13}} & \sigma_{C_{11}C_{33}} & \sigma_{C_{11}C_{66}} \\ \sigma_{C_{11}C_{13}} & \sigma_{C_{13}}^2 & \sigma_{C_{13}C_{33}} & \sigma_{C_{13}C_{66}} \\ \sigma_{C_{11}C_{33}} & \sigma_{C_{13}C_{33}} & \sigma_{C_{33}}^2 & \sigma_{C_{33}C_{66}} \\ \sigma_{C_{11}C_{66}} & \sigma_{C_{13}C_{66}} & \sigma_{C_{33}C_{66}} & \sigma_{C_{66}}^2 \end{pmatrix}$$

The means and covariance matrix of the prior data are both utilized in the subsequent inversion. While various examples, refer to TI parameters, as mentioned, one or more other types of anisotropy may be considered, alternatively or additionally to TI anisotropy.

Example: Lookup Table Generation (e.g., and/or other type of data structure)

For comparison with the measurements, the inversion can include the efficient estimation of synthetic (i.e., model-) velocities for a large number of different sets of candidate TI models as well as, potentially, for a large range of propagation directions. The reason for this efficiency condition is the fact that the determination of the qP and qSV group velocities as well as the Stoneley shear velocity, are computationally expensive and therefore time-consuming, see also Appendix B. For this reason, lookup tables can be generated prior to the inversion and are subsequently used over and over again during inversion of sonic data at individual depth levels as well as during each iteration at a single depth, which may be, for example, an average depth value for a depth interval, depending on resolution).

Separate lookup tables can be created for the normalized qP group velocity (i.e. $V_{qP}(\phi)/V_{P0}$), the normalized qSV group velocity (i.e. $V_{qSV}(\phi)/V_{P0}$), as well as for the Stoneley shear velocity. In such three cases, the lookup tables can be regular grids with pre-calculated velocities at the nodes.

In an example implementation of the inversion workflow, the lookup tables for the normalized qP and qSV group velocities have four dimensions, while the lookup table for the Stoneley shear has six dimensions. Solely for illustration, the table below summarizes the parameters and their limits as used in a computational framework; note though that other choices for the lookup table parameters and/or their limits are possible as well.

TABLE 1

Definition of examples of lookup table parameters and their upper and lower limits, as used in an example workflow implementation.

| | relative dip | | ε | | δ | | γ | | $V_{P0}/V_{S0}$ | | $V_{SH}(90)$ | |
|---|---|---|---|---|---|---|---|---|---|---|---|---|
| | low | high | low | high | low | high | low | high | low | high | low | high |
| $V_{qP}(\varphi)/V_{P0}$ & $V_{qSV}(\varphi)/V_{S0}$ | 0 | 90 | -.3 | 1.8 | -.4 | 0.8 | — | — | 1.4 | 5 | — | — |
| Stoneley shear | 0 | 90 | -.3 | 1.8 | -.4 | 0.8 | -.3 | 1.8 | 1.4 | 5 | 400 | 4100 |

As to the performance block 530 of the workflow 500 of FIG. 5, borehole sonic measurements can be inverted to obtain a relatively continuous description of the TI elastic parameters (e.g., continuous as to acquisition depths of the sonic measurements).

Figure 7:
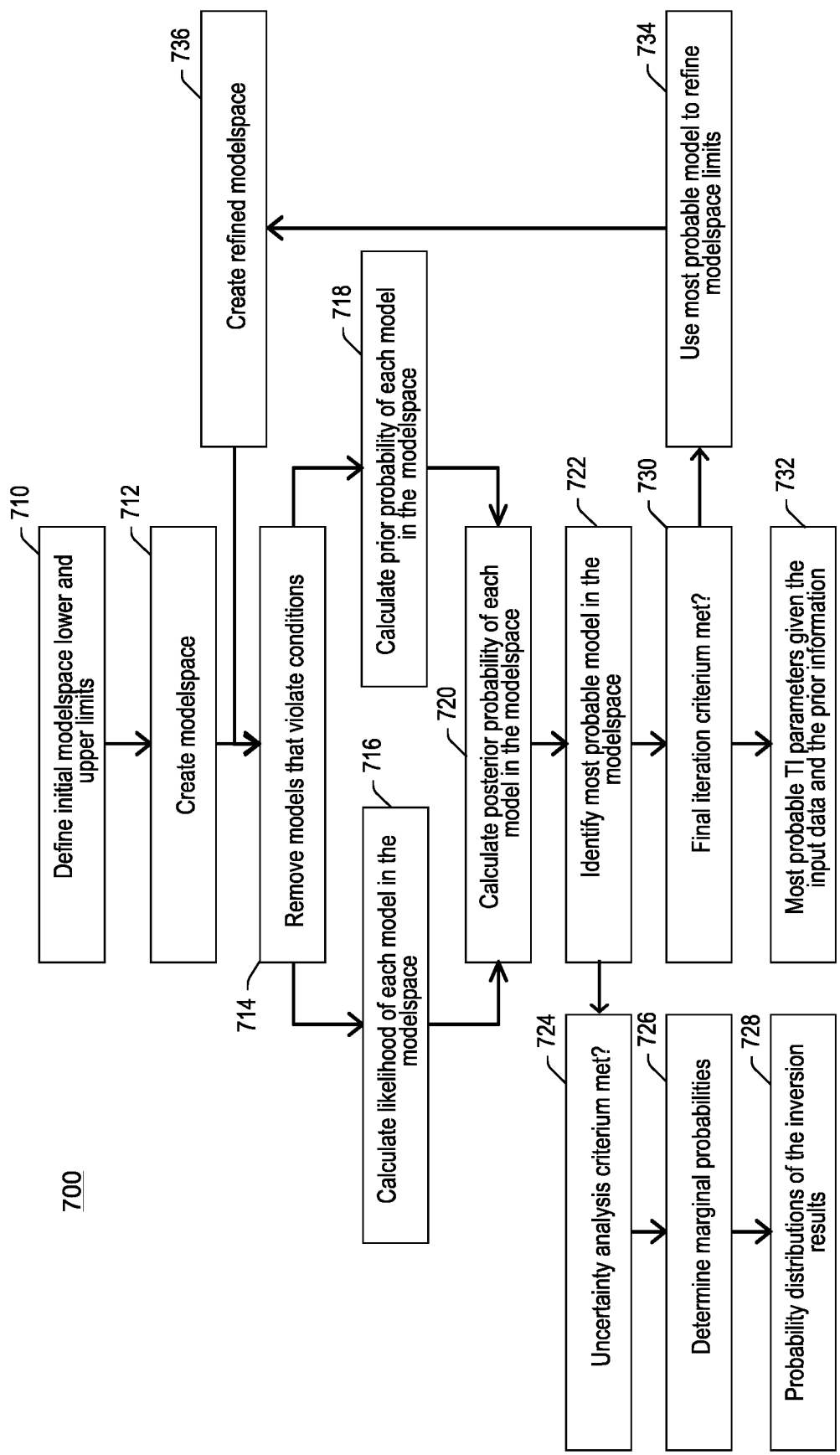
FIG. 7 illustrates an example of a method.

FIG. 7 shows an example of a method 700. The method 700 includes inverting (e.g., inversion), as may be, for example, carried out at an individual depth. As an example, the method 700 may be implemented at least in part in parallel and/or at least in part in series for a plurality of individual depths.

In the example of FIG. 7, the method 700 includes a definition block 710 for defining initial modelspace lower and upper limits, a creation block 712 for creating a modelspace, a removal block 714 for removing models that violate one or more conditions, a calculation block 716 for calculating the likelihood of each model in the modelspace, a calculation block 718 for calculating prior probability of each model in the modelspace, a calculation block 720 for calculating posterior probability of each model in the modelspace (e.g., based at least in part on results of the block 716 and/or the block 718), an identification block 722 for identifying the most probable model in the model space based at least in part on one or more of the posterior probabilities of block 720, an analysis block 724 for performing an uncertainty analysis as to whether a criterium (or criteria) has been met, a determination block 726 for determining marginal probabilities, a result block 729 for generating probability distributions of inversion results (e.g., as an output of the method 700), a decision block 730 for deciding whether a final iteration criterium (or criteria) has been met, a result block 732 for generating the most probable TI parameters as results given the input data and the prior information (e.g., as an output of the method 700), a utilization block 734 for utilizing the most probable model to refine one or more modelspace limits, and a creation block 736 for creating a refined modelspace.

As shown in the example of FIG. 7, the method 700 can include a loop that can create a refined modelspace per the block 736 and that can proceed to one or more of the blocks 716 and 718, optionally via the block 714.

As shown in the example of FIG. 7, the method 700 can output probable TI parameters (e.g., TI parameter values) per the block 732 and can output associated probability distributions per the block 728.

As an example, the method 700 may be part of a workflow or workflows that include acquiring data and/or controlling equipment in the field to perform one or more operations in the field as to a formation or formations that include one or more regions that exhibit TI anisotropy. For example, an operation can include drilling where drilling trajectory and/or other aspect of drilling (e.g., drill bit, bottom hole assembly (BHA), etc.) is based at least in part on one or more of the outputs of the method 700.

Below, various aspects of workflow actions are described, which may be aspects of the method 700 of FIG. 7. For example, under the heading "Define initial modelspace lower and upper limits", various aspects may correspond to the block 710 of the method 700 of FIG. 7, etc.

Example: Define Initial Modelspace Lower and Upper Limits

In this portion, the lower and upper limits can be defined for each of the dimensions of the initial modelspace, e.g., the modelspace that will be evaluated during the first iteration at the current depth.

A modelspace is defined here as a collection of TI models of which, as part of the inversion workflow, the corresponding synthetic velocities are to be compared with the measured velocities. A modelspace can include five dimensions, e.g., one dimension for each of five TI parameters. As an example, a framework may allow a user to choose the notation for the modelspace TI parameters, as long as the number of independent parameters is set to a desired number (e.g., consider an example of five independent parameters). As an example, in an implementation, the modelspace can be defined by combinations of (e.g., density-normalized) elastic stiffnesses $C_{11}$, $C_{33}$, $C_{44}$, and $C_{66}$, plus Thomsen's δ parameter.

As an example, modelspace limits can be set on the basis of predefined limits. As an example, an implementation can include setting on the basis of the input measurements at the current depth and at the current orientation φ, as follows.

From the phase velocity expression for $v_{SH}$ it follows that (see Appendix B):

$$C_{44} = \frac{v_{SH}^2(\varphi)}{1 + 2\gamma \sin^2 \varphi}$$

and $$C_{66} = \frac{v_{SH}^2(\varphi)}{\sin^2 \varphi + \frac{\cos^2 \varphi}{1 + 2\gamma}}$$

A lower limit for $C_{44}$ and an upper limit for $C_{66}$ is then obtained by assuming a realistic maximum value for γ, e.g. $\gamma_{max}=0.8$. Similarly, an upper limit for $C_{44}$ and a lower limit for $C_{66}$ is obtained by assuming a realistic minimum value for γ, e.g. $\gamma_{min}=0.2$.

In the special case of ε=δ (called "elliptical" anisotropy), the phase velocity of the compressional wave becomes (see Appendix B)

$$v_{qP}(\varphi) = V_{P0}\sqrt{1 + 2\varepsilon \sin^2 \varphi}$$

which can be rewritten as $$C_{33} = \frac{v_{qP}^2(\varphi)}{1 + 2\varepsilon \sin^2 \varphi}$$

and $$C_{11} = \frac{v_{qP}^2(\varphi)}{\sin^2 \varphi + \frac{\cos^2 \varphi}{1 + 2\varepsilon}}$$

A lower limit for $C_{33}$ and an upper limit for $C_{11}$ is then obtained by assuming a realistic maximum value for $\varepsilon$, e.g. $\varepsilon_{max}$=0.8. Similarly, an upper limit for $C_{33}$ and a lower limit for $C_{11}$ is obtained by assuming a realistic minimum value for $\varepsilon$, e.g. $\varepsilon_{min}$=0.2.

As an example, in an implementation, the fifth axis of the modelspace, i.e. $\delta$, has a predefined lower limit of −0.4 and a predefined upper limit of 0.6.

It is noted that, as an example, the assumptions regarding lower and upper limits for Thomsen's $\varepsilon$, $\delta$, $\gamma$, the assumption of elliptical anisotropy for $v_{qP}$, as well as the use of the phase expressions for $v_{qP}$ and $v_{SH}$, can have no implications for a final inversion result. For example, such assumptions can be made to reasonably constrain an initial modelspace; noting that subsequent (refined) modelspaces can be allowed to have limits that may exceed those of the initial modelspace, can have models for which $\varepsilon \neq \delta$, and can be evaluated, for example, assuming point source (group) instead of plane wave (phase) propagation.

Example: Create Modelspace

An initial modelspace can be created using previously determined limits for its five dimensions. As an example, each axis can be divided in a number of equally spaced points between its lower and upper limit, resulting a large number of combinations of the 5 TI parameters on a regular, 5-dimensional grid. For instance, assuming each axis of the modelspace contains six discrete values, then the total number of combinations (i.e., TI models) equals $6^5$=7776.

Example: Remove Models That Violate Conditions

For reasons of strain energy conditions (see, e.g., Helbig and Schoenberg, 1987), it is possible that not each of the TI combinations may be permissible. In such an example, one or more non-permissible TI models can be identified and removed from the modelspace.

Example: Calculate Likelihood Probability of Each Model in the Modelspace

The likelihood probability distribution p(d|m,I) expresses the probability p of observing d (for data) for the case of model m (a set of TI parameters from the modelspace), while assuming a set of propositions I to be true. Propositions can for instance include the relationship between the data and the model parameters (e.g., the group velocity expressions as discussed in Appendix B), or the chosen form for the likelihood distribution (e.g., "multivariate" Gaussian). As an example, in an implementation, the likelihood probability can be given by the following multivariate normal distribution (e.g., or one or more other types of probability distributions):

$$p(d \mid m, I) = \frac{1}{\sqrt{(2\pi)^N |\Sigma_{error}|}} \exp\left[\frac{1}{2}(d - F(m))^T \Sigma_{error}^{-1} (d - F(m))\right]$$

where F(m) represents a vector containing synthetic data ({qP, qSV, SH, Stoneley shear}-velocities) calculated on the basis of model vector m, N is the number of data, and $\Sigma_{error}$ is the covariance matrix of the measurement errors. If these errors are assumed to be independent, then the corresponding covariance matrix is diagonal with entries equal to the squared standard deviation of the measurement uncertainty (user-defined).

As an example, consider a case where, at a particular depth and orientation of the well relative to bedding, measurements of the qP, qSV, SH, and Stoneley shear velocities are available (i.e., N=4).

First, the lookup tables can be explored to find the lookup table nodes enclosing each model of the modelspace. For an individual model of a plurality of models, the four-dimensional lookup tables for the normalized qP and qSV velocities yield $2^4$=16 enclosing lookup table nodes, while that number is $2^6$=64 for the six-dimensional Stoneley shear lookup table.

While lookup tables are mentioned, one or more other types of data structures may be utilized with an aim to reduce computational time. As an example, relevant expressions (e.g., relating velocities to elastic properties) may be evaluated directly. For example, for a shear SH wave, it can, via a relatively computationally efficient expression, be evaluated. As an example, for the group velocities of the qP and qSV velocities, as well as for the Stoneley shear velocity, computations tend to be more demanding; such demands may be reduced via a data structure such as, for example, a lookup table. As an example, where computational resources are sufficient, a method may operate without a lookup table and perform computations as to velocities, etc.

Next, the velocities at the location of the model can be approximated via linear interpolation (e.g., and/or one or more other types of interpolation, which can include nonlinear interpolation(s)) of the lookup table velocities at the enclosing nodes. For an individual model in the modelspace, this process can yield (estimates of) the corresponding synthetic velocities at the current orientation: for this particular example, four synthetic velocities for an individual model in the modelspace. Returning to the expression for the likelihood probability, these four synthetic velocities are represented by the term F(m).

As an example, the likelihood probability of each model m can be determined by calculating the difference between the measurements and the synthetic velocities, i.e. d-F(m), followed by evaluation of the likelihood expression above.

Example: Calculate Prior Probability of Each Model in the Modelspace

The prior probability distribution p(m|I) expresses the probability p of model m in advance of any empirical evidence, while assuming a set of propositions I to be true. As an example, prior information can be defined as the probability of TI model m, in advance of considering the available measurement data (e.g., the sonic velocities).

As an example, in an implementation, the prior probability can be given by the following multivariate normal distribution (e.g., noting that one or more other types of probability distributions may be utilized, alternatively or additionally):

$$p(m \mid I) = \frac{1}{\sqrt{(2\pi)^N |\Sigma_{prior}|}} \exp\left[\frac{1}{2}(m - \mu_{prior})^T \Sigma_{prior}^{-1} (m - \mu_{prior})\right]$$

where n is the number of model parameters (e.g., n=5 if we have and apply prior knowledge on five TI parameters), $\Sigma_{prior}$ is the prior covariance matrix, and $\mu_{prior}$ is an array containing the prior means.

As an example, the prior probability of each model m can be determined by calculating the difference between the model and the prior means, i.e. m-$\mu_{prior}$, followed by evaluation of the prior probability expression above.

Example: Calculate Posterior Probability of Each Model in the Modelspace

The posterior probability of a model m is its probability after having taken into account the measurements (via the likelihood probability) as well as the prior information (via the prior probability). The posterior probability distribution is obtained from Bayes' rule as (see, e.g., Malinverno and Briggs, 2004), for example:

$$p(m \mid d, I) = \frac{p(m \mid, I)p(d \mid m, I)}{p(d \mid, I)} \propto p(m \mid, I)p(d \mid m, I)$$

i.e., the posterior probability is proportional to the product of the likelihood probability and the prior probability (the term p(d|,I) is called the marginal likelihood and can be ignored for our purposes).

The posterior probability distribution is analyzed to identify the currently most probable model m on basis of the measurements and the prior information (Identify most probable model in the modelspace). This model is subsequently used as the center for an updated and refined modelspace, with narrower limits and decreased incremental steps on the modelspace parameter axes (Use most probable model to refine modelspace limits and (create refined modelspace).

The process of refining and evaluating modelspaces continues until some criterium is met (Final iteration criterium met?), for instance, a criterium on the maximum allowed differences between most probable models found during successive iterations. The most probable model found during the final iteration is then saved as the inversion result for the current depth, at which point the workflow moves to the next depth.

Example: Uncertainty Analysis

The marginal distribution gives "the probabilities of various values of a subset of variables without reference to the values of the other variables". Marginal probabilities are calculated from the posterior probabilities of the modelspace by summing in four of the five dimensions while keeping the fifth dimension constant.

For example, suppose the $C_{11}$-axis of the modelspace is defined as $C_{11}$=[10, 20,30,40,50], i.e. there are five distinct values for $C_{11}$ in the modelspace. The marginal probability for $C_{11}$=10 can be calculated using $$p_{C_{11}}(C_{11} = 10) = \sum_{C_{33}, C_{44}, C_{66}, \delta} p(\{C_{11} = 10, C_{33}, C_{44}, C_{66}, \delta\} \mid d, I)$$

(e.g., and similarly for other discrete values for $C_{11}$) i.e., the marginal probability of $C_{11}$ being equal to 10 equals the summation of the probabilities of the TI models in the modelspace for which $C_{11}$=10. Evaluation of the marginal probabilities for other modelspace values for $C_{11}$ results in the marginal probability distribution for $C_{11}$. The standard deviation of this marginal distribution is one of the final outputs of the workflow (together with the inversion result itself), and it is a quantification of how well a particular parameter is constrained ($C_{11}$ in the case of this example) without consideration of the values of the other four parameters.

Determination of the marginal distributions is repeated for $C_{33}$, $C_{44}$, $C_{66}$ and $\delta$, and is in the practical implementation greatly facilitated by the fact that the modelspace itself is composed of a regular grid.

Once the standard deviations of the marginal distributions of the modelspace parameters ($C_{11}$, $C_{33}$, $C_{44}$, $C_{66}$ and $\delta$) have been determined, they are used in a Monte Carlo-type analysis to determine the corresponding uncertainties for the alternative TI notations (e.g., horizontal and vertical Poisson's ratios etc.).

Figure 8:
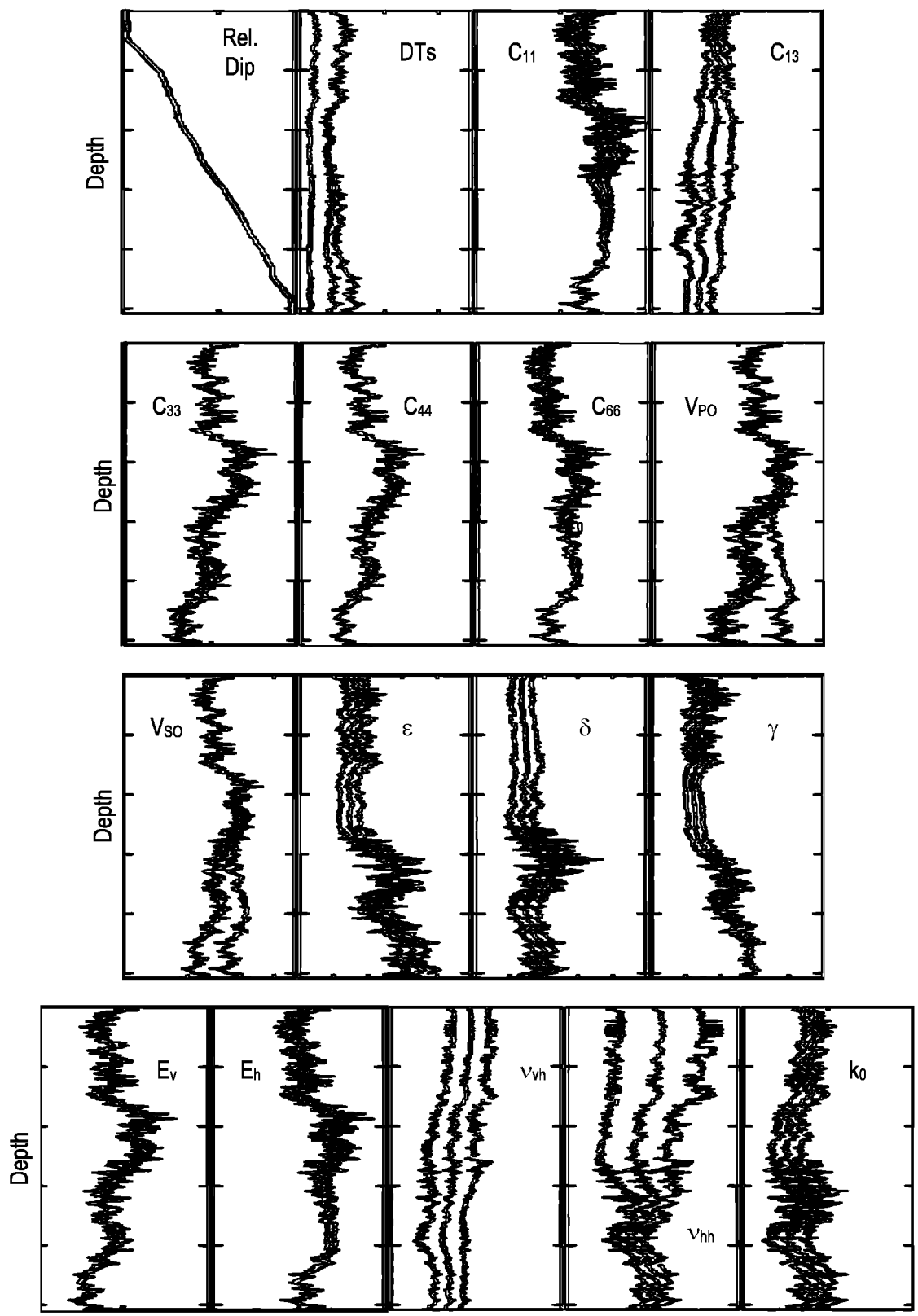
FIG. 8 illustrates an example of plots of information.

FIG. 8 shows example results of a method such as the method 700 of FIG. 7. The example results of FIG. 8 include seventeen (17) plots that are shown with respect to a depth axis, which is common to the plots. Each of the plots is identified with a corresponding parameter label. As shown in the plots of FIG. 8, the values of the various parameters tend to vary with respect to depth. As an example, a value or values at a depth can be determined via a method such as the method 700 of FIG. 7. One or more of the plots of FIG. 8 may be rendered to a display, optionally via a graphical user interface (GUI), which may be interactive and allow for assessment of values, etc., for example, to understand better the makeup of a subterranean environment.

The plots of FIG. 8 may be viewed as a case study with a representative inversion outcome in various kinds of notations, with the inversion result itself being generally a middle set of values of three sets of values in various of the plots where one set is a positive standard deviation and another set is a negative standard deviation.

As explained, in FIG. 8, inversion results are shown as a function of depth, from left to right and top to bottom, these include: relative dip, input sonic slownesses, inversion results plus uncertainties in various notations (respectively: $C_{11}$, $C_{13}$, $C_{33}$, $C_{44}$, $C_{66}$, $V_{P0}$, $V_{S0}$, $\varepsilon$, $\delta$, $\gamma$, $E_v$, $E_h$, $\nu_{vh}$, $\nu_{hh}$, $k_0$ where $k_0$ is defined as the ratio $C_{13}/C_{33}$).

FIGS. 9, 10, 11, 12, 13, 14 and 15 illustrate an example of a workflow for a single well depth-by-depth TI characterization. Such an example may be adapted for multiple wells. In various figures, coding is utilized to indicate various portions of the workflow. For example, an "I" in a circle represents input, a "C" in a circle represents calculation, a "D" in a circle represents decision, and an "R" in a circle represents result(s), which may be, for example, intermediate or other (e.g., a final result(s)).

FIG. 9 shows various parameters 900 and associated values for the parameters, which may include, for example, default, automatic and/or user set values. As shown, the parameters 900 can include inversion settings, smart parameter settings, modelspace definitions, miscellaneous setting, lookup table (LUT) settings, etc. As shown, LUT settings may be for particular velocities. As an example, a graphical user interface may be rendered to a display that allows a user to view, input, edit, etc. one or more of the settings.

Figure 10:
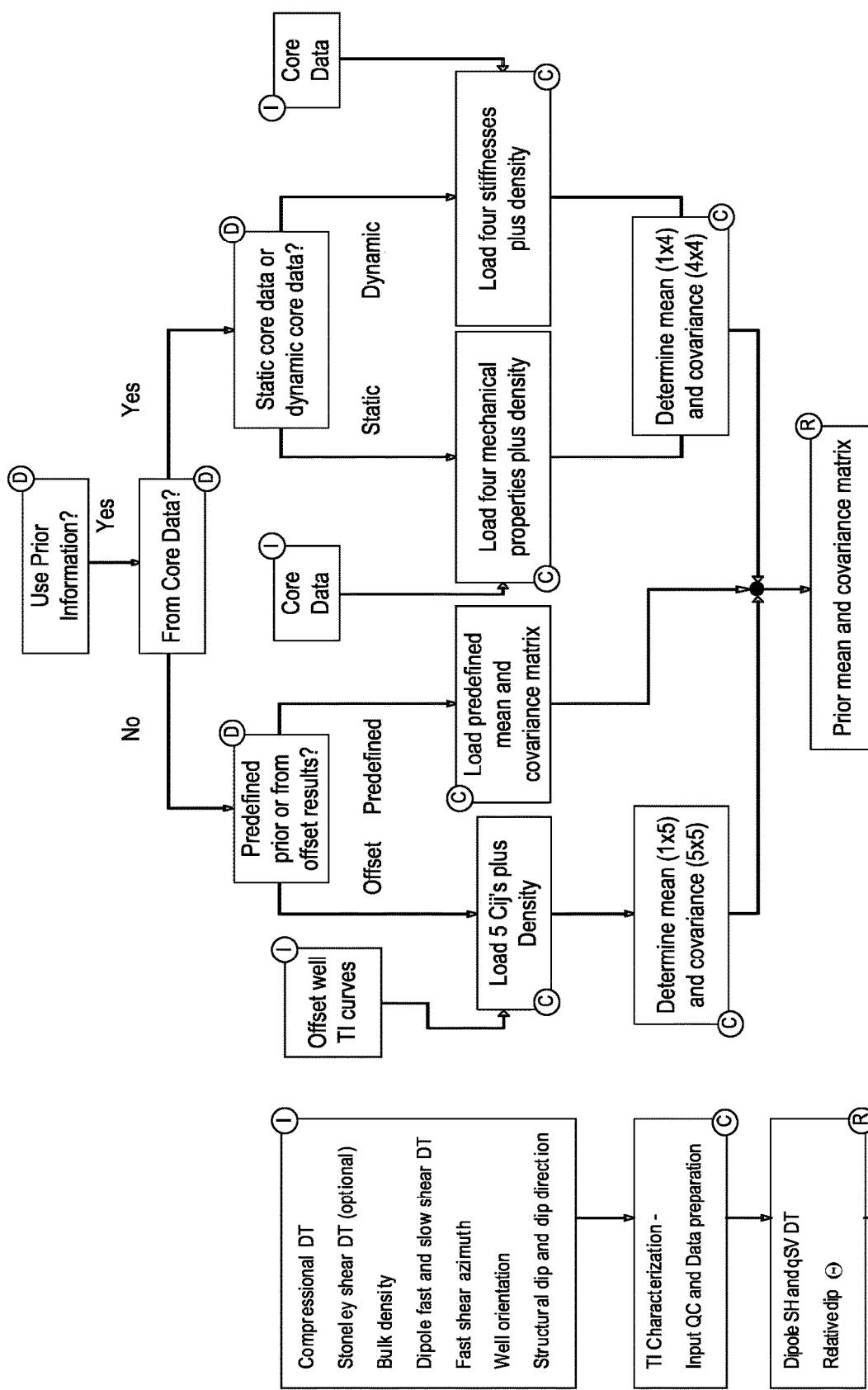
FIG. 10 illustrates an example of a portion of a workflow.

FIG. 10 shows a portion of a workflow that can generate, as a result, a prior mean and covariance matrix based at least in part on one or more types of information. Such a result may be combined with additional information and/or one or more results, as illustrated in FIG. 10, which can include, for example, information as illustrated in FIG. 9.

Figure 11:
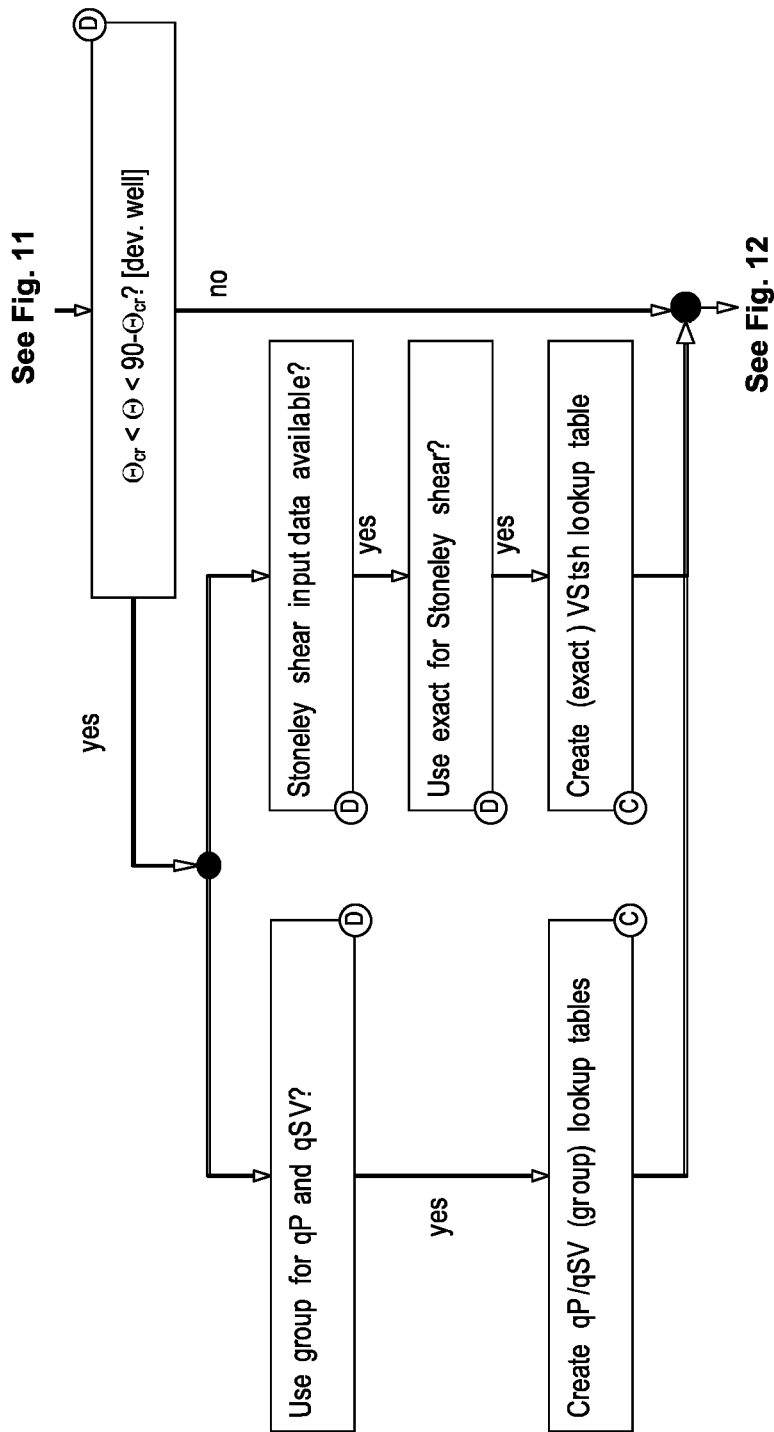
FIG. 11 illustrates an example of a portion of a workflow.

FIG. 11 shows a continuation of the workflow of FIG. 10 where a decision can be made as to whether a well (e.g., a borehole) is deviated. In such an example, various actions may be taken where a determination is made that a well (e.g., a borehole) is deviated. As shown, decisions and calculations can occur such as, for example, calculations that can generate one or more values for one or more data structures such as lookup table data structures.

Figure 12:
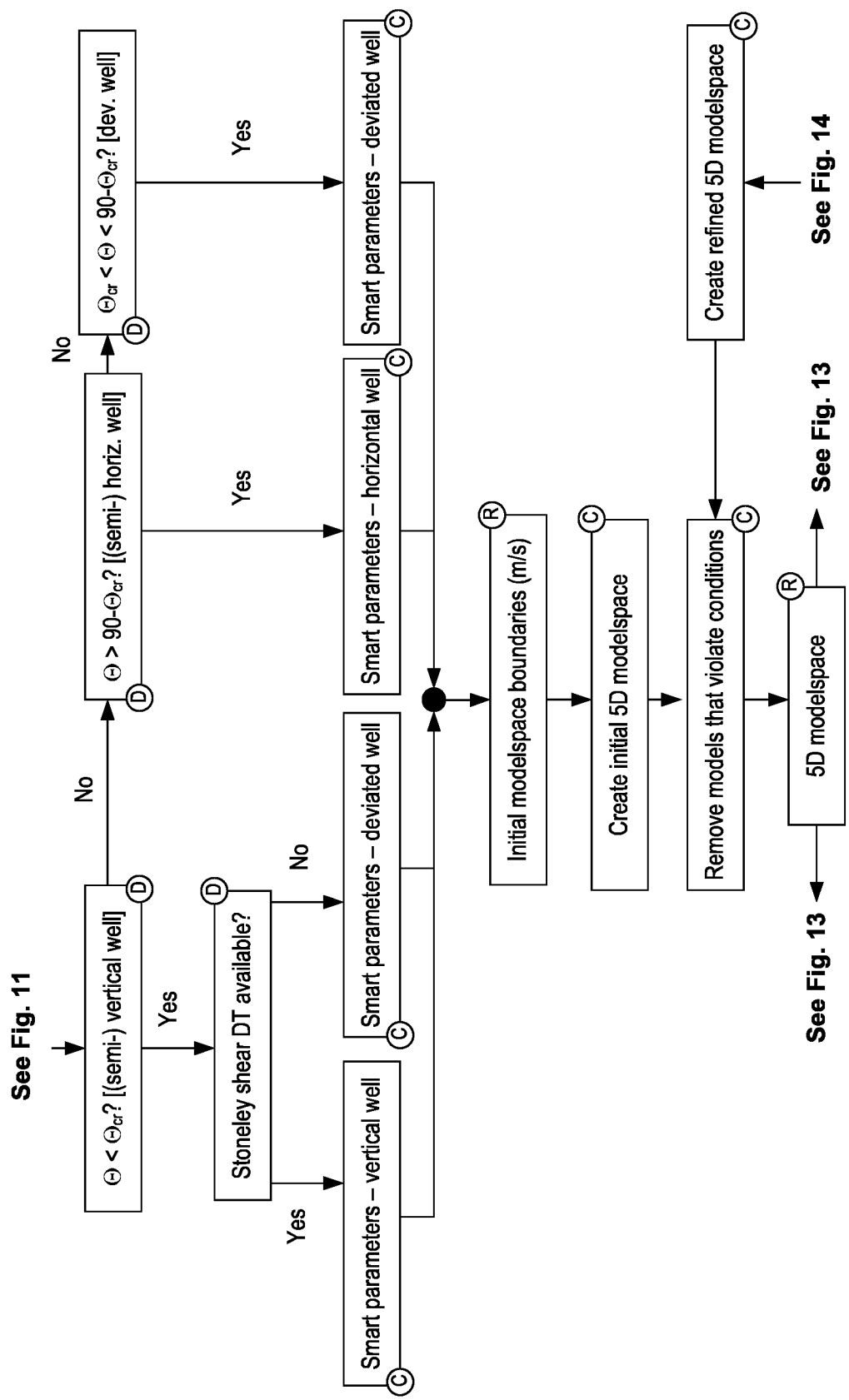
FIG. 12 illustrates an example of a portion of a workflow.

FIG. 12 shows a continuation of the workflow of FIG. 11 where various decisions can be made as to type of well (e.g., borehole), particularly with respect to geometric aspects (e.g., vertical, horizontal, deviated, etc.). As shown in FIG. 12, a creation block can include creating an initial modelspace, which may be, for example, a 5D modelspace; noting that reference may be made to the method 700 of FIG. 7, which includes the creation block 712 for creating an initial modelspace. As shown in FIG. 12, a result can be a 5D modelspace where one or more models may be removed from the initial modelspace that violate one or more conditions.

Figure 13:
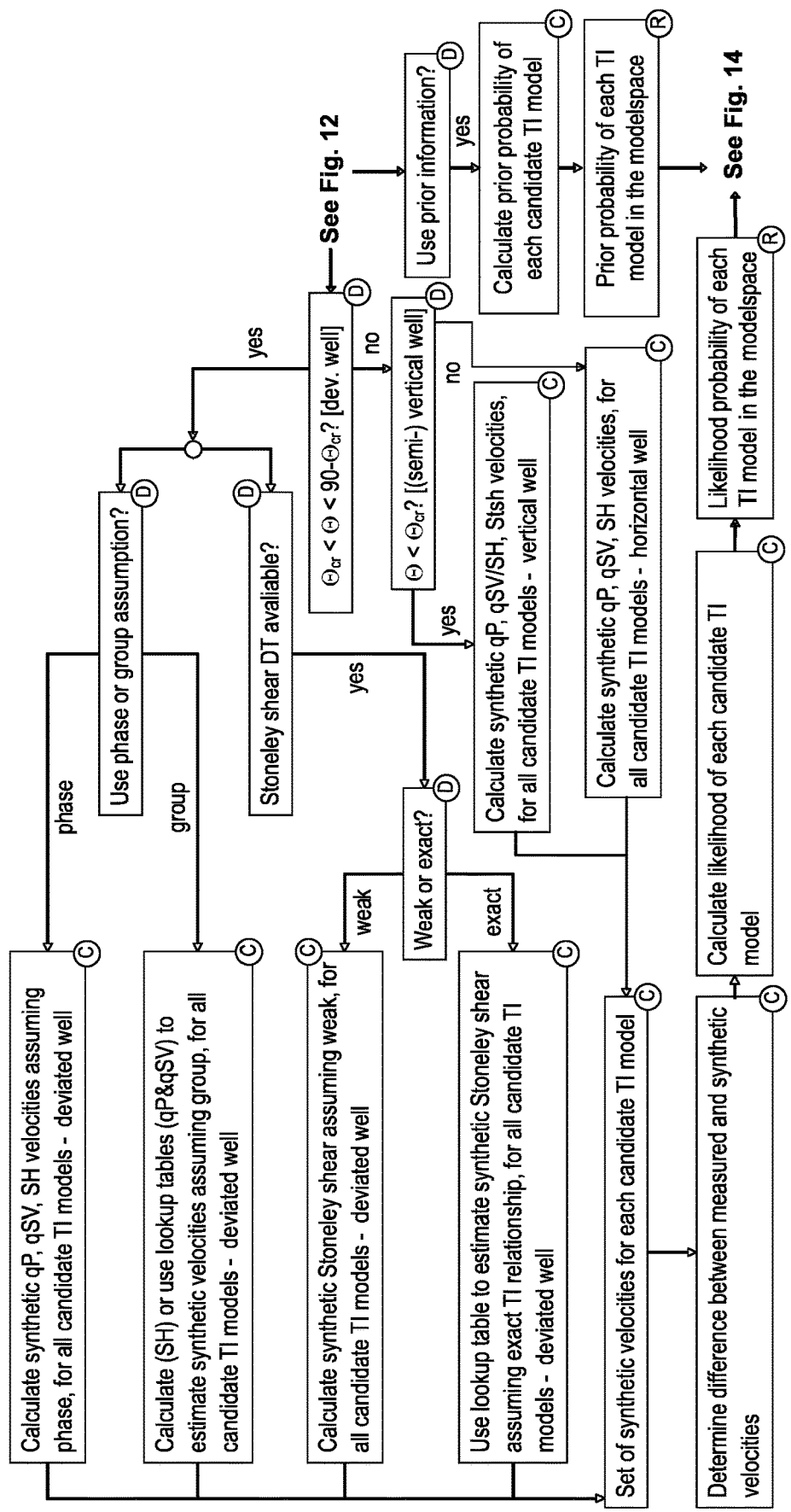
FIG. 13 illustrates an example of a portion of a workflow.

FIG. 13 shows a continuation of the workflow of FIG. 12 that can include generating one or more results. For example, results can be for prior probability of each TI model in the modelspace of FIG. 12 and/or for likelihood probability of each TI model in the modelspace.

As shown in FIG. 13, decisions can be made as to various aspects, including phase or group assumption, weak or exact, etc. Types of calculations and/or access to certain data structures (e.g., lookup tables) can depend on such decisions. As shown in FIG. 13, a calculation block can include calculating a set of synthetic velocities for each candidate TI model and another calculation block can include calculating difference(s) between measured and synthetic velocities. Such difference(s) can be utilized in another calculation block to calculate likelihood of each candidate TI model, which can be a basis for outputting likelihood probability of each TI model in the modelspace.

Figure 14:
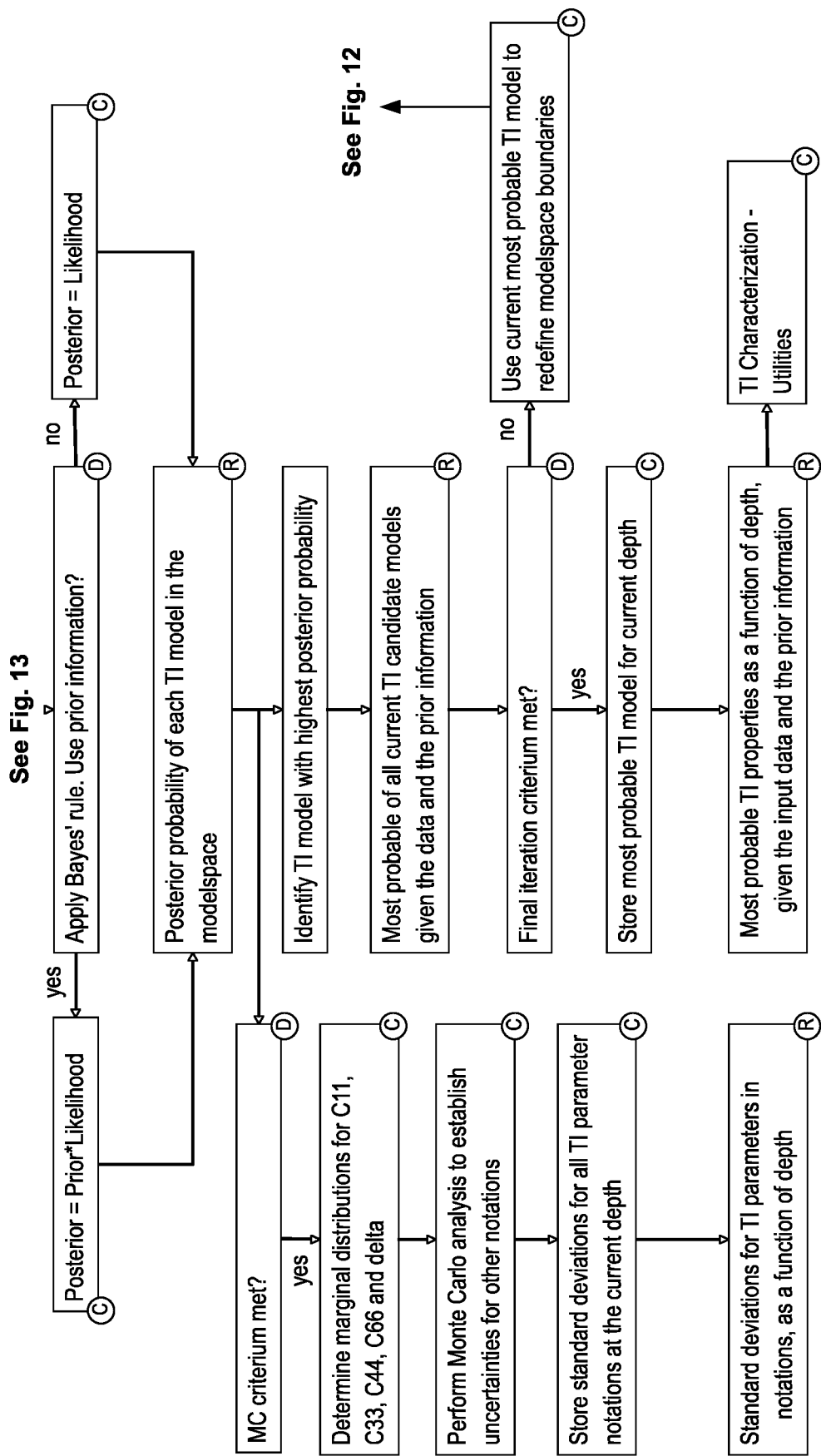
FIG. 14 illustrates an example of a portion of a workflow.

FIG. 14 shows a continuation of the workflow of FIG. 13 as well as a pathway to the workflow of FIG. 12. As shown in FIG. 14, Bayes' rule (e.g., or theorem). Bayes' rule can describe the probability of an event, based on prior knowledge of conditions that might be related to the event.

As shown in FIG. 14, outputs can include standard deviations for one or more of the TI parameters in one or more notations, which may be given with respect to depth and can include most probable TI properties with respect to depth given input data and prior information. As to the latter, a calculation block may utilize the output as to formation characterization, which may be via one or more frameworks, tools, etc., notated as TI characterization utilities in FIG. 14. While TI characterization utilities are shown, a workflow may implement one or more other types of anisotropy characterization utilities (e.g., orthorhombic, etc.).

As mentioned with respect to the method 700 of FIG. 7, a loop may exist for purposes of modelspace refinement, for example, to create a refined modelspace. As shown in FIG. 14, a calculation block can use a current most probable TI model to redefine one or more modelspace boundaries, the results thereof may be received by the creation block for creating a refined 5D modelspace as shown in FIG. 12. As shown in FIG. 14, a decision block may decide whether a final iteration criterium (or criteria) have been met to decide whether an iteration is to occur as to modelspace refinement. As shown in FIG. 14, where that decision block decides that the criterium (or criteria) have been met, the workflow can proceed to storing a most probable TI model for a current depth. As mentioned, while the example of FIG. 14 is illustrated with respect to TI anisotropy, one or more other types of anisotropy may be considered (e.g., orthorhombic, etc.), where, for example, a modelspace may differ from a 5D modelspace and include appropriate models for the one or more types of anisotropy under consideration.

As an example, a geologic environment may include one or more types of anisotropic formations. As an example, a workflow may proceed in an iterative manner with respect to depth where a depth iteration may be associated with a type of anisotropy and where, for example, a different depth iteration may be associated with another type of anisotropy. Output from such a workflow may present a relatively continuous description of various elastic parameters with respect to depth where, for example, the number and/or type may vary depending on the anisotropy at a depth or depths. As an example, a workflow may include a decision block and/or a trigger that causes the workflow to adjust one or more aspects with respect to anisotropy and, for example, corresponding models (e.g., modelspace). For example, consider a geologic environment that includes a TI formation and an orthorhombic formation where a workflow can adjust from one type of formation to another type of formation during depth iteration (e.g., at a trigger depth, etc.). In such an example, plots may be generated and rendered to a display that indicate where such a transition occurred and, for example, a number of plots with respect to depth may differ depending on the types of information desired for characterization of one or more of the formations of the geologic environment.

Figure 15:
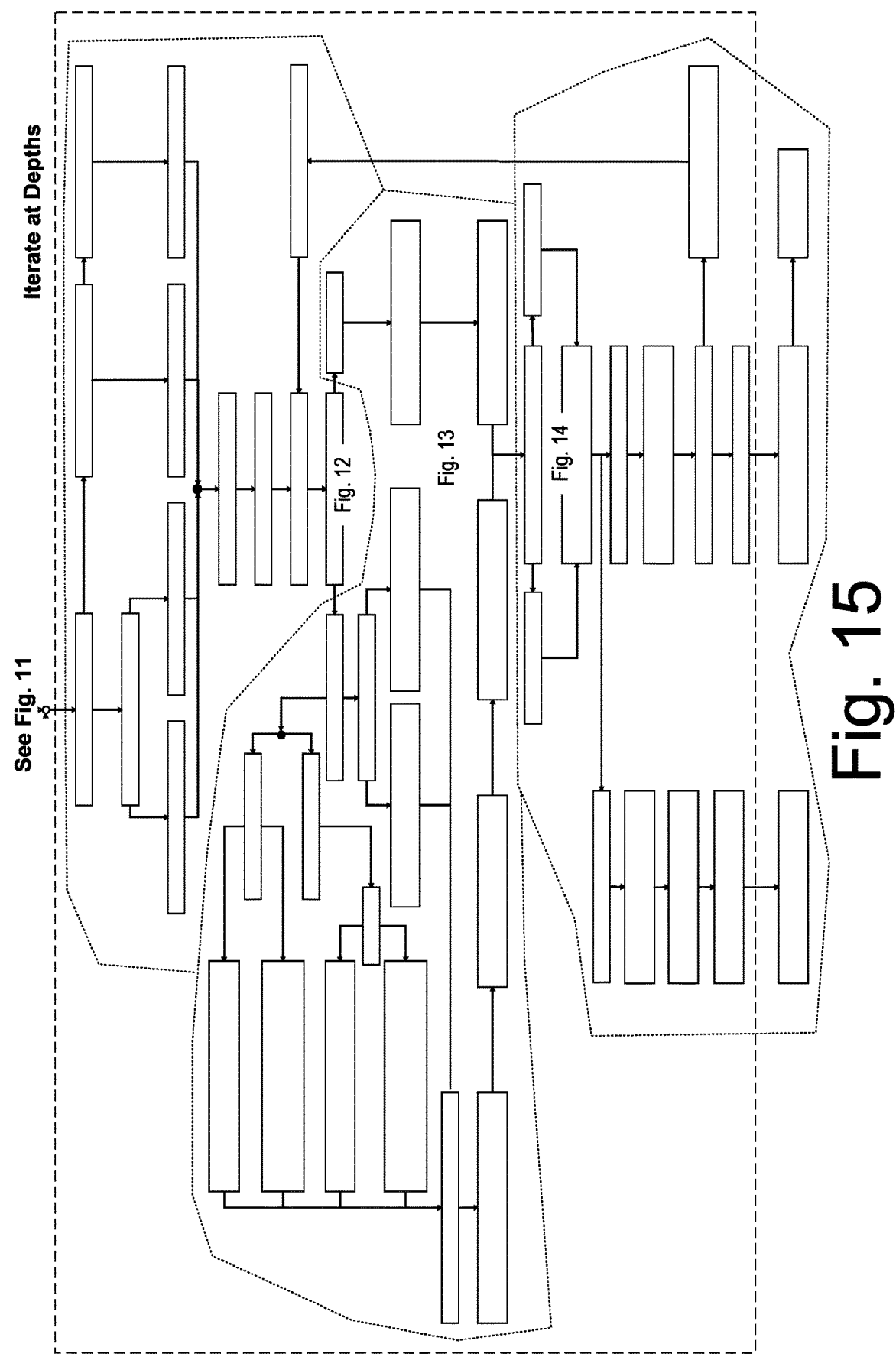
FIG. 15 illustrates a block diagram of the portions of the workflow of FIGS. 12, 13 and 14.

FIG. 15 shows an example of a schematic overview of the various blocks of FIG. 12, FIG. 13 and FIG. 14 with respect to a dashed block that can represent a depth iteration. For example, where various depths are to be investigated, at least some portions of the workflows of FIG. 12, FIG. 13 and FIG. 14 can be iterated with respect to depth. As mentioned, a geologic environment can include formations at different depths (e.g., different depth spans) that can be of different types of anisotropy. As an example, a geologic environment may include one or more formations that lack anisotropy and at least one formation that includes anisotropy. In such an example, a workflow may trigger an adjustment at a particular depth or depths to transition from one type of formation to another type of formation (e.g., using appropriate corresponding models in an appropriate corresponding modelspace).

As an example, a workflow can include information and actions as illustrated in FIGS. 9, 10, 11, 12, 13, 14 and 15. Such a workflow may be utilized as part of a wireline sonic survey that includes acquiring sonic data (e.g., sonic dipole data, etc.) via a wireline tool (or tools) in a geologic environment. Such a workflow may be applied to one or more of vertical, horizontal and deviated bores in a formation. As an example, a bore may include various types of portions as to trajectory geometry (e.g., one or more of vertical, horizontal and deviated). As an example, a geologic environment can include one or more regions that may be characterized as including TI anisotropy and/or as including a different type of anisotropy (e.g., and/or as including one or more regions that lack anisotropy).

As an example, a workflow can take borehole sonic data (e.g., compressional, dipole fast and slow shear, and optionally Stoneley shear) acquired at one or more well deviations relative to bedding, and invert at least a portion of such input data to arrive at a description of the five transversely isotropic (TI) elastic properties of the encountered formations. In such an example, the description may be relatively continuous with respect to depth (see, e.g., various plots of FIG. 8).

As an example, a workflow may be probabilistic rather than deterministic in that such a workflow gives a distribution of possible outcomes (e.g., a probability distribution of possible outcomes). Such a probabilistic approach allows for the use of "prior" information to guide inversion, where such prior information may be in the form of, for example, one or more of a database of core measurements from a particular field, basin, or client.

A workflow may be utilized in a domain that is relevant to geomechanics and seismic processing and interpretation in anisotropic environments. As an example, a workflow may be applied to one or more types of sonic datasets and, for example, act to decrease opportunity for errors and bias during interpretation (e.g., as may occur via choice of inappropriate models, inconsistencies between different wells from the same operator, etc.). As an example, a workflow may "bridge the gap" between slownesses acquired in anisotropic environments versus what a client may desire such as anisotropic elastic properties.

As an example, a system may include one or more sets of instructions, which may be provided to analyze data, control a process, perform a task, perform a workstep, perform a workflow, etc.

As an example, a method can include receiving information that includes sonic data; processing the information to generate processed information; performing an inversion based at least in part on the processed information; and outputting values for elastic parameters based at least in part on the inversion. In such an example, outputting can output the values for the elastic parameters as a substantially continuous description for each of the elastic parameters.

As an example, a method can include generating processed information that includes arithmetic means and variances for a plurality of anisotropy parameters. As an example, processed information can include covariances between anisotropy parameters. As an example, processed information can include arithmetic means and variances for a plurality of anisotropy parameters and covariances between the anisotropy parameters.

As an example, a method can include inverting for five independent parameters of elastic, transversely isotropic (TI) media on the basis of sonic slowness measurements and prior information that includes the statistical means and (co-)variances of those five independent parameters. In such an example, the independent parameters can be or include anisotropy parameters (e.g., for TI media). As an example, where one or more other types of anisotropic media are considered to be present in a geologic environment, one or more other types of anisotropy parameters may be included (e.g., orthorhombic, etc.).

As an example, a method can include outputting probability distributions, which may be associated with values for elastic parameters, continuous representations of elastic parameters, etc. As an example, elastic parameters can include elastic parameters associated with a depth. As an example, a continuous description of an elastic parameter can provide values with respect to depth (e.g., for one or more depths, etc.).

As an example, a method can include receiving prior information where the prior information includes sets of values for elastic parameters (e.g., TI, orthorhombic, etc.).

As an example, a method can include at least one five parameter model. For example, consider at least one five parameter model that includes four elastic stiffness parameters such as, for example, $C_{11}$, $C_{33}$, $C_{44}$, and $C_{66}$.

As an example, a method can include defining a multi-parameter modelspace. For example, consider a multi-parameter modelspace defined by combinations of elastic stiffness parameters $C_{11}$, $C_{33}$, $C_{44}$, and $C_{66}$ and the Thomsen's $\delta$ parameter. As an example, elastic parameters can include at least five independent anisotropic parameters. As mentioned, a method can include, for example, nine independent anisotropic parameters or, for example, twenty-one independent anisotropic parameters. As an example, a method can include utilizing one or more different modelspaces where each of the modelspaces is dimensioned according to a type of formation, which can be an anisotropic formation. As an example, a modelspace may be associated with a depth, a range of depths, ranges of depths, etc. As an example, a method can include adjusting a modelspace definition based at least in part on depth where, for example, a type of anisotropy may change with respect to depth. As mentioned, a method may be performed at least in part iteratively with respect to depth where output may be a substantially continuous description of one or more elastic parameters with respect to depth. Where a method adjusts due to a change in anisotropy with respect to depth, output can include a substantially continuous description of one or more elastic parameters with respect to depth for a span of depths that includes different types of formations (e.g., different types of anisotropic formations). In such an example, probability information can be output that corresponds to the different types of formations; noting that the probability information may indicate that one or more output elastic parameter values for one type of formation may differ from one or more of those of another type of formation. In such an example, a user may discern and assess elastic parameter values (e.g., probabilistically) with respect to type of formation. Decisions as to one or more operations in the field may be based on output where, for example, a decision may pertain to depth and/or type of formation (e.g., consider changing one or more equipment parameters of a bottom hole assembly (e.g., bit, etc.) based at least in part on the output).

As an example, sonic data can include velocity measurements where, for example, a method can include taking into account measurement uncertainty of the velocity measurements.

As an example, a method can include receiving information that includes elastic property information and that includes sonic data acquired via a tool disposed at a plurality of depths in a bore in a subterranean environment that includes at least one anisotropic formation; processing the information to generate processed information where the processed information includes variance information associated with the elastic property information and where the processed information includes velocity information and orientation information associated with the sonic data; performing an inversion based at least in part on the processed information; and outputting values for elastic parameters based at least in part on the inversion.

As an example, a system can include a processor; memory accessible by the processor; and processor-executable instructions stored in the memory that are executable to instruct the system to: receive information that includes sonic data; process the information to generate processed information; perform an inversion based at least in part on the processed information; and output values for elastic parameters based at least in part on the inversion. In such an example, the values for the elastic parameters can include values that define a substantially continuous description for each of the elastic parameters.

As an example, one or more computer-readable storage media can include computer-executable instructions to instruct a system to: receive information that includes sonic data; process the information to generate processed information; perform an inversion based at least in part on the processed information; and output values for elastic parameters based at least in part on the inversion. In such an example, the values for the elastic parameters can include values that define a substantially continuous description for each of the elastic parameters.

Figure 16:
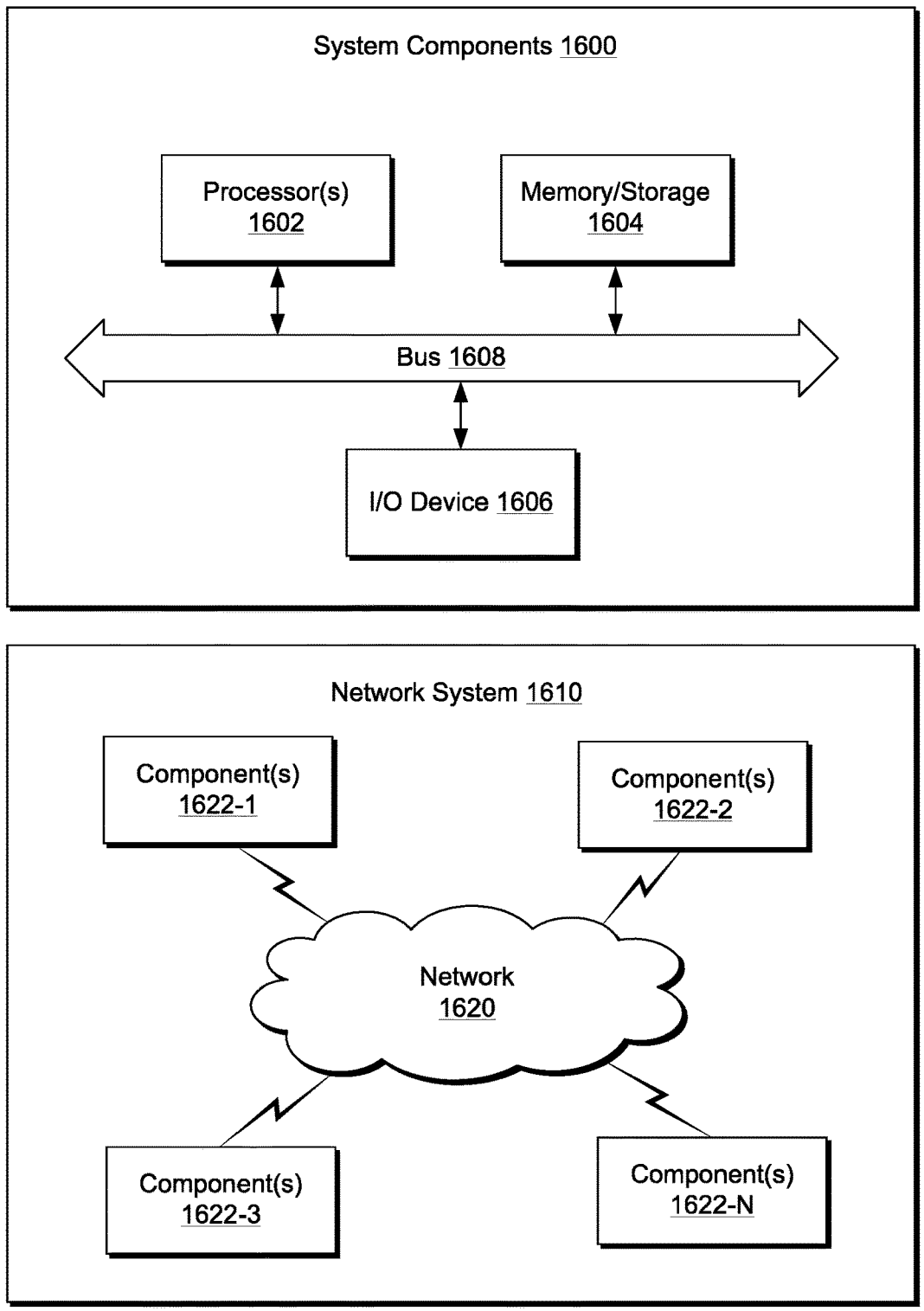
FIG. 16 illustrates example components of a system and a networked system.

FIG. 16 shows components of an example of a computing system 1600 and an example of a networked system 1610. The system 1600 includes one or more processors 1602, memory and/or storage components 1604, one or more input and/or output devices 1606 and a bus 1608. In an example embodiment, instructions may be stored in one or more computer-readable media (e.g., memory/storage components 1604). Such instructions may be read by one or more processors (e.g., the processor(s) 1602) via a communication bus (e.g., the bus 1608), which may be wired or wireless. The one or more processors may execute such instructions to implement (wholly or in part) one or more attributes (e.g., as part of a method). A user may view output from and interact with a process via an I/O device (e.g., the device 1606). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1610. The network system 1610 includes components 1622-1, 1622-2, 1622-3, . . . 1622-N. For example, the components 1622-1 may include the processor(s) 1602 while the component(s) 1622-3 may include memory accessible by the processor(s) 1602. Further, the component(s) 1622-2 may include an I/O device for display and optionally interaction with a method. The network 1620 may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

BIBLIOGRAPHY

The Following Documents are Incorporated by Reference Herein:
1. Burridge, R., Kostek, S., and Kurkjian, A., Tube waves, seismic waves and effective sources, Wave motion (1993).
2. Chi, S., and Tang, X., Stoneley-wave speed modeling in general anisotropic formations, Geophysics (2006).
3. Gu, M., Quirein, J., Murphy, E., Rivera Barraza, S., and Ou, L., Method for acoustic anisotropy interpretation in shales when the Stoneley-wave velocity is missing, Petrophysics (2016).
4. Haldorsen, J., Johnson, D., Plona, T., Sinha, B. Valero, H. P., and Winkler, K., Borehole acoustic waves, Oilfield Review (2006).
5. Helbig, K. and Schoenberg, M., Anomalous polarization of elastic waves in transversely isotropic media, Journal of the Acoustical Society of America (1987).
6. Home, S., and Walsh, J., Transverse isotropy estimation from dipole sonic logs acquired in pilot and production wells, Geophysical Prospecting (2014).
7. Home, S., and Walsh, J., Single well anisotropy inversion using velocity measurements, U.S. Pat. No. 9,213,122 B2 (2015).
8. Jocker, J., Wielemaker, E., Prioul, R., and Valero, H. P., Method to characterize heterogeneous anisotropic media, Patent application US 20140365420 A1 (2014).
9. Jones, L. E., and Wang, H. F., Ultrasonic velocities in Cretaceous shales from the Williston basin, Geophysics (1981).
10. Kainkaryam, S., et al., Ray-based imaging and model building in tilted orthorhombic media, SEG New Orleans Annual Meeting (2015).
11. Kainkaryam, S., et al., Quadratic form tomography for tilted orthorhombic media, SEG New Orleans Annual Meeting (2015).
12. Karpfinger, F. and Jocker, J. and Prioul, R., Theoretical estimate of the tube-wave modulus in arbitrarily anisotropic media, Geophysics (2012).

13. Luthi, S. M., Geological well logs: their use in reservoir modeling, Springer (2000).
14. Malinverno, A., and Briggs, V., Expanded uncertainty quantification in inverse problems: Hierarchical Bayes and empirical Bayes, Geophysics (2004).
15. Mavko, G., Mukerji, T., and Dvorkin, J., *The Rock Physics Handbook*, Cambridge University Press (2003).
16. Narhari et al., A case study of prestack orthotropic AVAz inversion for fracture characterization of a tight Deep Carbonate reservoir in Kuwait, SEG Denver Annual Meeting (2014).
17. Norris, A., and Sinha, B., *Weak elastic anisotropy and the tube wave*, Geophysics (August 1993).
19. Nye, J. F., *Physical properties of crystals*, Oxford University Press (1985).
20. Sayers, C., *Seismic anisotropy of shales*, Geophysical Prospecting (2005).
21. Sinha, B., Sayers, C., and Endo, T., Determination of anisotropic moduli of Earth formations, U.S. Pat. No. 6,714,480 B2 (2004).
22. Sinha, B., Multi-frequency inversion of modal dispersions for estimating formation anisotropy constants, Patent application CA 2913289 A1, published Dec. 18, 2014
23. Suarez-Rivera, R., and Bratton, T., Estimating horizontal stress from three-dimensional anisotropy, U.S. Pat. No. 8,175,807 B2 (2012).
24. Thomsen, L., Weak elastic anisotropy, Geophysics (1986).
25. Tsvankin, I., P-wave signatures and notation for transversely isotropic media: An overview, Geophysics (1996).
26. Tsvankin, I., Anisotropic parameters and P-wave velocity for orthorhombic media, Geophysics, Vol. 62, No. 4, pp. 1292-1309 (1997).
27. Tsvankin, I., Seismic signatures and analysis of reflection data in anisotropic media, Elsevier (2005).
28. Zoback, M. D., Reservoir geomechanics, Cambridge University Press (2007).

APPENDIX A: ELASTIC ANISOTROPY IN TI MEDIA

Shales are a major component of sedimentary basins (Jones and Wang, 1981) and play a role in fluid flow and seismic-wave propagation because of their low permeability and anisotropic microstructure (Sayers, 2005). It is commonly accepted that shales exhibit anisotropic behavior due to the constituent plate-shaped clay particles oriented parallel to each other. Most shales can be described, to a good approximation, as being Transversely Isotropic (TI) with an axis of symmetry that tends to be orthogonal to the shale beds.

For a linearly elastic medium, Hooke's law provides the relationship between the stress ($\sigma$) and strain ($\varepsilon$) tensors (Mavko et al., 2003):

$$\sigma_i = C_{ij}\varepsilon_j,$$

where $C_{ij}$ is a component of the stiffness tensor C, and where we have used the abbreviated "Voigt" notation for the subscripts (Nye, 1985). Defined in a Cartesian grid, the elastic stiffness tensor C for a transversely isotropic (TI) medium is defined as:

$$C = \begin{pmatrix} C_{11} & C_{12} & C_{13} & 0 & 0 & 0 \\ C_{12} & C_{11} & C_{13} & 0 & 0 & 0 \\ C_{13} & C_{13} & C_{33} & 0 & 0 & 0 \\ 0 & 0 & 0 & C_{44} & 0 & 0 \\ 0 & 0 & 0 & 0 & C_{44} & 0 \\ 0 & 0 & 0 & 0 & 0 & C_{66} \end{pmatrix},$$

where the TI symmetry axis is parallel to the $x_3$-axis of the Cartesian reference frame. Five of the six elastic stiffnesses in the above tensor are independent, i.e. $C_{11}$, $C_{33}$, $C_{13}$, $C_{44}$, $C_{66}$ while $C_{12}=C_{11}-2C_{66}$. It is these five independent elastic stiffnesses that we seek to determine.

Depending on the background of a user, an alternative notation for the five independent constants of a TI medium may be desired. For instance, a geophysicist may desire a notation (Thomsen, 1986) based on the three Thomsen parameters $\varepsilon$, $\delta$, and $\gamma$, in addition to two velocities $V_{p0}$ and $V_{s0}$, while a geomechanicist may have more affinity with geomechanical parameters such as the vertical and horizontal Young's moduli (resp. $E_v$ and $E_h$), the vertical and horizontal Poisson's ratios (resp. $v_v$ and $v_h$), and the shear modulus of the plane containing the TI symmetry axis, i.e. $\mu_v$. For a transversely isotropic medium with a vertical axis of symmetry (e.g. horizontal shale beds), the Thomsen parameters and the geomechanical parameters are related to the elastic stiffnesses $C_{ij}$ as follows:

Relation between Thomsen Parameters and Elastic Stiffnesses $V_{P0}=\sqrt{C_{33}/\rho}$ Vertical P-wave velocity
$V_{S0}=\sqrt{C_{44}/\rho}$ Vertical S-wave velocity
$\varepsilon=(C_{11}\ C_{33})/(2C_{33})$ P-wave anisotropy
$\gamma=(C_{66}\ C_{44})/(2C_{44})$ S-wave anisotropy
$\delta=[(C_{13}+C_{44})^2\ (C_{33}\ C_{44})^2]/[2C_{33}(C_{33}\ C_{44})]$ Small-offset NMO factor Relation between Geomechanical Parameters and Elastic Stiffnesses $E_v=C_{33}\ 2\ C_{13}^2/(C_{11}+C_{12})$ Vertical Young's modulus
$E_h=[(C_{11}\ C_{12})(C_{11}C_{33}\ 2C_{13}^2+C_{12}C_{33})]/(C_{11}C_{33}\ C_{13}^2)$ Horizontal Young's modulus
$\mu_v=C_{44}$ Vertical plane shear modulus
$v_{vh}=C_{13}/(C_{11}+C_{12})$ Vertical Poisson's ratio
$v_{hh}=(C_{12}C_{33}\ C_{13}^2)/(C_{11}C_{33}\ C_{13}^2)$ Horizontal Poisson's Ratio

APPENDIX B: WAVE PROPAGATION VELOCITIES AS A FUNCTION OF TI ELASTIC PARAMETERS

In Thomsen notation, the relationships for the compressional ($v_{qP}$) and SV shear ($v_q$sv) phase velocities are given by (Thomsen (1986), Tsvankin (1996)):

$$\frac{v_{qP}(\theta)}{V_{P0}} = \sqrt{1+\varepsilon\sin^2\theta\ \frac{f}{2}+\frac{f}{2}\sqrt{\left(1+\frac{2\varepsilon\sin^2\theta}{f}\right)^2\ \frac{2(\varepsilon\ \delta)\sin^22\theta}{f}}}$$

$$\frac{v_{qSV}(\theta)}{V_{S0}} = \sqrt{1+\varepsilon\sin^2\theta\ \frac{f}{2}\ \frac{f}{2}\sqrt{\left(1+\frac{2\varepsilon\sin^2\theta}{f}\right)^2\ \frac{2(\varepsilon\ \delta)\sin^22\theta}{f}}}$$

where $$f \equiv 1 - \frac{V_{S0}^2}{V_{P0}^2},$$

Hence, the normalized compressional ($v_{qP}/V_{P0}$) and SV ($v_{qSV}/V_{S0}$) phase velocities are solely a function of phase angle $\theta$, Thomsen parameters $\varepsilon$ and $\delta$ and the $V_{P0}/V_{S0}$-ratio.

The relation for the phase velocity of the SH wave ($v_{SH}$) is given by $$v_{SH}(\theta) = V_{S0}\sqrt{1 + 2\gamma \sin^2\theta}.$$

Note that equivalent expressions exist using $C_{ij}$ notation instead of Thomsen notation.

Phase velocities (lower-case v) correspond to the propagation velocity of so-called plane waves generated by a plane-wave source. However, in practice, borehole wave propagation may be better approximated as originating from point sources. The group velocity (upper-case V) is the velocity with which a point-source-generated wavefield propagates in the direction of the group angle $\phi$.

The group velocity of the SH wave ($V_{SH}$) is given by $$V_{SH}(\phi) = \frac{V_{S0}\sqrt{1 + 2\gamma}}{\sqrt{1 + 2\gamma \cos^2 \phi}}$$

For the qP and qSV waves, the group angle $\phi(\theta)$ corresponding to phase angle $\theta$, is given by:

$$\tan\phi(\theta) = \left(\tan\theta + \frac{1}{v(\theta)}\frac{dv(\theta)}{d\theta}\right) / \left(1 - \frac{\tan\theta}{v(\theta)}\frac{dv(\theta)}{d\theta}\right).$$

The corresponding group velocity magnitude V in terms of the phase velocity magnitude v, is given by:

$$V(\phi(\theta)) = \sqrt{v^2(\theta) + \left(\frac{dv(\theta)}{d\theta}\right)^2}$$

Finding the phase angle $\theta$ that corresponds to the desired group angle $\phi(\theta)$ can be computationally expensive and, therefore, time-consuming. In the practical implementation of an inversion workflow, this challenge can be addressed, for example, by making use of pre-calculated lookup tables (e.g., or other data structure or structures).

Aside from the compressional and two shear wave slownesses, some advanced logging tools can record so-called Stoneley wave data that can be processed to obtain a fourth input into an inversion workflow. This Stoneley-based slowness can be referred to as the "horizontal shear" or the "Stoneley shear". The complex relation between the horizontal shear/Stoneley shear and the independent TI properties is described, among others, in Burridge et al. (1993), Chi and Tang (1993), and Karpfinger et al. (2010). Calculation of the Stoneley shear can be computationally expensive and, therefore, time-consuming. In the practical implementation of an inversion workflow, this challenge can be addressed, for example, by making use of a pre-calculated lookup table (e.g., or other data structure or structures).

What is claimed is:

1. A method comprising:
   receiving information that comprises elastic property information and that comprises sonic data comprising a set of N measurements and acquired via a tool disposed in a bore in a subterranean environment that comprises at least one anisotropic formation, wherein N is an integer value greater than 0;
   processing the information to generate first processed information wherein the first processed information comprises variance information associated with the elastic property information and wherein the first processed information comprises velocity information and orientation information associated with the sonic data;
   performing a first inversion based at least in part on the first processed information by at least iteratively accessing the velocity information to determine synthetic velocities that, in part, determine likelihood probabilities;
   receiving prior information from a database of stored prior information comprising second elastic property information for various types of subsurface media;
   processing the prior information to generate second processed information wherein the second processed information comprises at least variance information associated with the second elastic property information;
   performing a second inversion based at least in part on the second processed information to generate prior probabilities; and
   outputting values for elastic parameters based at least in part on a the likelihood probabilities and the prior probabilities, wherein the values comprise a set of at least N+1 values, wherein the elastic parameters describe formation properties with respect to a depth of a logging interval.

2. The method of claim 1 wherein the the values for the elastic parameters are provided as a substantially continuous description with respect to depth of the logging interval.

3. The method of claim 1 wherein the first processed information comprises arithmetic means and variances for a plurality of anisotropy parameters as types of elastic parameters.

4. The method of claim 3 wherein the first processed information comprises arithmetic means and variances for a plurality of anisotropy parameters and covariances between the anisotropy parameters.

5. The method of claim 1 wherein the first processed information comprises covariances between anisotropy parameters as types of elastic parameters.

6. The method of claim 1 wherein the outputting comprises outputting probability distributions.

7. The method of claim 1 wherein the elastic property information comprises sets of values for elastic parameters.

8. The method of claim 1 comprising at least one five parameter model.

9. The method of claim 8 wherein the at least one five parameter model comprises four elastic stiffness parameters.

10. The method of claim 9 wherein the four elastic stiffness parameters comprise $C_{11}$, $C_{33}$, $C_{44}$, and $C_{66}$.

11. The method of claim 1 comprising defining a multi-parameter modelspace.

12. The method of claim 11 wherein the multi-parameter modelspace is defined by combinations of elastic stiffness parameters $C_{11}$, $C_{33}$, $C_{44}$, and $C_{66}$ and the Thomsen's $\delta$ parameter.

13. The method of claim 1 wherein the elastic parameters comprise at least five independent anisotropy parameters.

14. The method of claim 1 wherein the sonic data comprises velocity measurements.

15. The method of claim 14 comprising taking into account measurement uncertainty of the velocity measurements.

16. A system comprising:
a processor;
memory accessible by the processor; and
processor-executable instructions stored in the memory that are executable to instruct the system to:
   receive information that comprises elastic property information and that comprises sonic data comprising a set of N measurements and acquired via a tool disposed in a bore in a subterranean environment that comprises at least one anisotropic formation, wherein N is an integer value greater than 0;
   process the information to generate first processed information wherein the first processed information comprises variance information associated with the elastic property information and wherein the first processed information comprises velocity information and orientation information associated with the sonic data;
   perform a first inversion based at least in part on the first processed information via at least iterative access to the velocity information to determine synthetic velocities that, in part, determine likelihood probabilities;
   receive prior information from a database of stored prior information comprising second elastic property information for various types of subsurface media;
   process the prior information to generate second processed information wherein the second processed information comprises at least variance information associated with the second elastic property information;
   perform a second inversion based at least in part on the second processed information to generate prior probabilities; and
   output values for elastic parameters based at least in part on a the likelihood probabilities and the prior probabilities, wherein the values comprise a set of at least N+1 values, wherein the elastic parameters describe formation properties with respect to a depth of a logging interval.

17. The system of claim 16 wherein the values for the elastic parameters are provided as a substantially continuous description with respect to depth of the logging interval.

18. One or more non-transitory computer-readable storage media comprising computer-executable instructions to instruct a system to:
   receive information that comprises elastic property information and that comprises sonic data comprising a set of N measurements and acquired via a tool disposed in a bore in a subterranean environment that comprises at least one anisotropic formation, wherein N is an integer value greater than 0;
   process the information to generate first processed information wherein the first processed information comprises variance information associated with the elastic property information and wherein the first processed information comprises velocity information and orientation information associated with the sonic data;
   perform a first inversion based at least in part on the first processed information via at least iterative access to the velocity information to determine synthetic velocities that, in part, determine likelihood probabilities;
   receive prior information from a database of stored prior information comprising second elastic property information for various types of subsurface media;
   process the prior information to generate second processed information wherein the second processed information comprises at least variance information associated with the second elastic property information;
   perform a second inversion based at least in part on the second processed information to generate prior probabilities; and
   output values for elastic parameters based at least in part on a the likelihood probabilities and the prior probabilities, wherein the values comprise a set of at least N+1 values, wherein the elastic parameters describe formation properties with respect to a depth of a logging interval.

\* \* \* \* \*